United States Patent
Abdelilah et al.

(10) Patent No.: US 6,650,657 B1
(45) Date of Patent: Nov. 18, 2003

(54) SYSTEMS, METHODS AND COMPUTER PROGRAM PRODUCTS FOR IDENTIFYING DIGITAL IMPAIRMENTS IN MODEM SIGNALS

(75) Inventors: Youssef Abdelilah, Holly Springs, NC (US); Gordon Taylor Davis, Chapel Hill, NC (US); Ajay Dholakia, Gattikon (CH); Dongming Hwang, Cary, NC (US); Fredy D. Neeser, Langnau (CH); Malcolm Scott Ware, Raleigh, NC (US); Hua Ye, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/429,859

(22) Filed: Oct. 29, 1999

(51) Int. Cl.[7] .................................................. H04J 3/24
(52) U.S. Cl. ..................... 370/474; 370/523; 375/222
(58) Field of Search .......................... 370/522, 523, 370/465, 474, 476; 375/222, 356, 377

(56) References Cited

U.S. PATENT DOCUMENTS

| | | | |
|---|---|---|---|
| 3,557,308 A | 1/1971 | Alexander et al. | 178/69.5 |
| 3,622,877 A | 11/1971 | MacDavid et al. | 324/73 R |
| 3,683,120 A | 8/1972 | Schenkel | 179/15 A |
| 3,729,717 A | 4/1973 | de Koe et al. | 340/172.5 |
| 4,112,427 A | 9/1978 | Hofer et al. | 340/347 |
| 4,132,242 A | 1/1979 | Carroll, Jr. | 137/263 |
| 4,208,630 A | 6/1980 | Martinez | 375/7 |
| 4,237,552 A | 12/1980 | Aikoh et al. | 370/83 |
| 4,270,027 A | 5/1981 | Agrawal et al. | 179/81 R |

(List continued on next page.)

FOREIGN PATENT DOCUMENTS

| | | | |
|---|---|---|---|
| EP | 0 473 116 A2 | 8/1991 | H04N/1/00 |
| EP | 0 659 007 A2 | 11/1994 | H04M/11/06 |
| EP | 0 669 740 A2 | 12/1994 | H04L/27/00 |
| FR | 2 345 019 | 3/1976 | H04L/27/10 |
| WO | WO 96/18261 | 6/1996 | H04M/11/00 |
| WO | WO 98/37657 | 8/1998 | |

OTHER PUBLICATIONS

Erup, et al., *Interpolation in Digital Modems—Part II: Implementations and Performance*, IEEE Transactions on Communications, vol. 41, No. 6, pp. 998–1008 (Jun. 1993).

(List continued on next page.)

*Primary Examiner*—Ajit Patel
*Assistant Examiner*—Chirag Shah
(74) *Attorney, Agent, or Firm*—Myers, Bigel, Sibley & Sajovec, P. A.; Scott W. Reid

(57) ABSTRACT

Robbed Bit Signaling (RBS) and PAD digital impairments in sets of Digital Impairment Learning (DIL) signals that are repeatedly transmitted from a server modem to a client modem during DIL intervals are identified by identifying a PAD level for the sets of DIL signals in the DIL intervals and then identifying an RBS type for individual sets of DIL signals based upon the PAD levels so identified. The PAD level may be identified using model DIL signals that correspond to PAD levels that are not subject to RBS. The RBS type may be identified using model DIL signals that correspond to multiple RBS types that are subject to the identified PAD level. More specifically, one of the DIL intervals that contains DIL signals that are not subject to RBS is identified. A PAD level for the DIL signals in the one of the DIL intervals so identified then is determined. The PAD level that was determined is applied to the DIL signals in remaining ones of the DIL intervals, to identify an RBS for the DIL signals in the remaining ones of the DIL intervals.

47 Claims, 5 Drawing Sheets

U.S. PATENT DOCUMENTS

| | | | |
|---|---|---|---|
| 4,434,322 A | 2/1984 | Ferrell | 178/22.13 |
| 4,450,556 A | 5/1984 | Boleda et al. | 370/58 |
| 4,577,310 A | 3/1986 | Korsky et al. | 370/58 |
| 4,578,796 A | 3/1986 | Charalambous et al. | 375/8 |
| 4,720,861 A | 1/1988 | Bertrand | 381/36 |
| 4,731,816 A | 3/1988 | Hughes-Hartogs | 379/98 |
| 4,756,007 A | 7/1988 | Qureshi et al. | 375/37 |
| 4,760,598 A | 7/1988 | Ferrell | 380/44 |
| 4,797,898 A | 1/1989 | Martinez | 375/7 |
| 4,833,706 A | 5/1989 | Hughes-Hartogs | 379/98 |
| 4,868,863 A | 9/1989 | Hartley et al. | 379/98 |
| 4,884,285 A | 11/1989 | Heynen et al. | 375/25 |
| 4,890,303 A | 12/1989 | Bader | 375/107 |
| 4,890,316 A | 12/1989 | Walsh et al. | 379/98 |
| 4,894,847 A | 1/1990 | Tjahjadi et al. | 375/121 |
| 4,901,333 A | 2/1990 | Hodgkiss | 375/98 |
| 4,943,980 A | 7/1990 | Dobson et al. | 375/42 |
| 4,953,210 A | 8/1990 | McGlynn et al. | 380/48 |
| 4,967,413 A | 10/1990 | Otani | 371/37.4 |
| 4,972,360 A | 11/1990 | Cuckier et al. | 364/724.04 |
| 4,985,902 A | 1/1991 | Gurcan | 375/14 |
| 4,991,169 A | 2/1991 | Davis et al. | 370/77 |
| 4,995,030 A | 2/1991 | Helf | 370/32.1 |
| 5,005,144 A | 4/1991 | Nakajima et al. | 364/565 |
| 5,007,047 A | 4/1991 | Sridhar et al. | 370/32.1 |
| 5,014,299 A | 5/1991 | Klupt et al. | 379/98 |
| 5,033,062 A | 7/1991 | Morrow et al. | 375/7 |
| 5,038,365 A | 8/1991 | Belloc et al. | 375/8 |
| 5,040,190 A | 8/1991 | Smith et al. | 375/4 |
| 5,052,000 A | 9/1991 | Wang et al. | 371/43 |
| 5,058,134 A | 10/1991 | Chevillat et al. | 375/39 |
| 5,065,410 A | 11/1991 | Yoshida et al. | 375/98 |
| 5,067,125 A | 11/1991 | Tsuchida | 370/79 |
| 5,068,875 A | 11/1991 | Quintin | 375/78 |
| 5,107,520 A | 4/1992 | Karam et al. | 375/60 |
| 5,111,481 A | 5/1992 | Chen et al. | 375/14 |
| 5,119,401 A | 6/1992 | Tsujimoto | 375/14 |
| 5,119,403 A | 6/1992 | Krishnan | 375/39 |
| 5,134,611 A | 7/1992 | Steinka et al. | 370/79 |
| 5,142,552 A | 8/1992 | Tzeng et al. | 375/14 |
| 5,157,690 A | 10/1992 | Buttle | 375/14 |
| 5,187,732 A | 2/1993 | Suzuki | 379/5 |
| 5,210,755 A | 5/1993 | Nagler et al. | 370/108 |
| 5,225,997 A | 7/1993 | Lederer et al. | 364/550 |
| 5,253,272 A | 10/1993 | Jaeger et al. | 375/60 |
| 5,253,291 A | 10/1993 | Naseer et al. | 379/406 |
| 5,265,151 A | 11/1993 | Goldstein | 379/97 |
| 5,285,474 A | 2/1994 | Chow et al. | 375/13 |
| 5,291,479 A | 3/1994 | Vaziri et al. | 370/58.2 |
| 5,311,578 A | 5/1994 | Bremer et al. | 379/97 |
| 5,317,594 A | 5/1994 | Goldstein | 375/8 |
| 5,351,134 A | 9/1994 | Yaguchi et al. | 358/435 |
| 5,353,280 A | 10/1994 | Ungerböck | 370/32.1 |
| 5,386,438 A | 1/1995 | England | 375/121 |
| 5,394,110 A | 2/1995 | Mizoguchi | 329/304 |
| 5,394,437 A | 2/1995 | Ayanoglu et al. | 375/222 |
| 5,398,303 A | 3/1995 | Tanaka | 395/51 |
| 5,402,445 A | 3/1995 | Matsuura | 375/229 |
| 5,406,583 A | 4/1995 | Dagdeviren | 375/5 |
| 5,418,842 A | 5/1995 | Cooper | 379/98 |
| 5,432,794 A | 7/1995 | Yaguchi | 371/5.5 |
| 5,434,884 A | 7/1995 | Rushing et al. | 375/235 |
| 5,475,711 A | 12/1995 | Betts et al. | 375/240 |
| 5,491,720 A | 2/1996 | Davis et al. | 375/222 |
| 5,513,216 A | 4/1996 | Gadot et al. | 375/233 |
| 5,519,703 A | 5/1996 | Chauffour et al. | 370/84 |
| 5,528,625 A | 6/1996 | Ayanoglu et al. | 375/222 |
| 5,528,679 A | 6/1996 | Taarud | 379/34 |
| 5,533,048 A | 7/1996 | Dolan | 375/222 |
| 5,534,913 A | 7/1996 | Majeti et al. | 348/7 |
| 5,546,395 A | 8/1996 | Sharma et al. | 370/84 |
| 5,563,908 A | 10/1996 | Kaku et al. | 375/222 |
| 5,566,211 A | 10/1996 | Choi | 375/332 |
| 5,598,401 A | 1/1997 | Blackwell et al. | 379/94 |
| 5,625,643 A | 4/1997 | Kaku et al. | 375/222 |
| 5,634,022 A | 5/1997 | Crouse et al. | 395/704 |
| 5,640,387 A | 6/1997 | Takahashi et al. | 370/359 |
| 5,646,958 A | 7/1997 | Tsujimoto | 375/233 |
| 5,671,250 A | 9/1997 | Bremer et al. | 375/222 |
| 5,694,420 A | 12/1997 | Ohki et al. | 375/222 |
| 5,710,792 A | 1/1998 | Fukawa et al. | 375/229 |
| 5,724,393 A | 3/1998 | Dagdeviren | 375/296 |
| 5,726,765 A | 3/1998 | Yoshida et al. | 358/412 |
| 5,729,226 A | 3/1998 | Betts et al. | 341/94 |
| 5,732,104 A | 3/1998 | Brown et al. | 375/222 |
| 5,734,663 A | 3/1998 | Eggenberger | 371/39.1 |
| 5,751,717 A | 5/1998 | Babu et al. | 370/466 |
| 5,751,796 A | 5/1998 | Scott et al. | 379/93.31 |
| 5,754,594 A | 5/1998 | Betts et al. | 375/285 |
| 5,757,849 A | 5/1998 | Gelblum et al. | 375/222 |
| 5,757,865 A | 5/1998 | Kaku et al. | 375/344 |
| 5,761,247 A | 6/1998 | Betts et al. | 375/316 |
| 5,768,311 A | 6/1998 | Betts et al. | 375/222 |
| 5,778,024 A | 7/1998 | McDonough | 375/216 |
| 5,784,377 A | 7/1998 | Baydar et al. | 370/463 |
| 5,784,405 A | 7/1998 | Betts et al. | 375/222 |
| 5,784,415 A | 7/1998 | Chevillat et al. | 375/341 |
| 5,793,809 A | 8/1998 | Holmquist | 375/242 |
| 5,796,808 A | 8/1998 | Scott et al. | 379/93.31 |
| 5,801,695 A | 9/1998 | Townshend | 375/340 |
| 5,805,669 A | 9/1998 | Bingel et al. | 379/28 |
| 5,809,075 A | 9/1998 | Townshend | 375/254 |
| 5,812,537 A | 9/1998 | Betts et al. | 370/286 |
| 5,815,534 A | 9/1998 | Glass | 375/326 |
| 5,822,371 A | 10/1998 | Goldstein et al. | 375/242 |
| 5,825,816 A | 10/1998 | Cole et al. | 375/222 |
| 5,825,823 A | 10/1998 | Goldstein et al. | 375/286 |
| 5,831,561 A | 11/1998 | Cai et al. | 341/106 |
| 5,835,532 A | 11/1998 | Strolle et al. | 375/233 |
| 5,835,538 A | 11/1998 | Townshend | 375/295 |
| 5,838,724 A | 11/1998 | Cole et al. | 375/222 |
| 5,839,053 A | 11/1998 | Bosch et al. | 455/13.1 |
| 5,844,940 A | 12/1998 | Goodson et al. | 375/222 |
| 5,850,388 A | 12/1998 | Anderson et al. | 370/252 |
| 5,850,421 A | 12/1998 | Misra et al. | 375/354 |
| 5,852,631 A | 12/1998 | Scott | 375/222 |
| 5,862,141 A | 1/1999 | Trotter | 370/468 |
| 5,862,179 A | 1/1999 | Goldstein et al. | 375/242 |
| 5,862,184 A | 1/1999 | Goldstein et al. | 375/295 |
| 5,870,429 A | 2/1999 | Moran, III et al. | 375/222 |
| 5,872,817 A | 2/1999 | Wei | 375/341 |
| 5,881,066 A | 3/1999 | Lepitre | 371/20.5 |
| 5,881,102 A | 3/1999 | Samson | 375/222 |
| 5,887,027 A | 3/1999 | Cohen et al. | 375/222 |
| 5,911,115 A | 6/1999 | Nair et al. | 455/63 |
| 5,914,982 A | 6/1999 | Bjarnason et al. | 375/222 |
| 5,918,204 A | 6/1999 | Tsurumaru | 704/214 |
| 5,926,506 A | 7/1999 | Berthold et al. | 375/222 |
| 6,108,354 A * | 8/2000 | Scull | 370/523 |
| 6,181,737 B1 * | 1/2001 | Okunev | 375/222 |
| 6,185,249 B1 * | 2/2001 | Drucker | 375/222 |
| 6,272,171 B1 * | 8/2001 | Okunev | 375/222 |
| 6,381,266 B1 * | 4/2002 | Zhang | 375/222 |
| 6,381,267 B1 * | 4/2002 | Abdelilah | 375/222 |

OTHER PUBLICATIONS

Fischer, *Signal Mapping for PCM Modems, V–pcm Rapporteur Meeting*, Sunriver, Oregon, USA, , 5 pgs. (Sep. 4–12, 1997).

Gardner, *Interpolation in Digital Modems—Part I: Fundamentals*, IEEE Transactions on Communications, vol. 41, No. 3, pp. 501–507 (Mar. 1993).

Humblet et al., *The Information Driveway*, IEEE Communications Magazine, pp. 64–68 (Dec. 1996).

Kalet et al., *The Capacity of PCM Voiceband Channels*, IEEE International Conference on Communications '93, pp. 507–511 (Geneva, Switzerland, May 23–26, 1993).

Mueller et al., *Timing Recovery in Digital Synchronous Data Receiver*, IEEE Transactions on Communications, vol. Com–24, No. 5, pp. 516–531 (May 1976).

Okubo et al., *Building Block Design of Large Capacity PCM–TDMA Subscriber System and Direct Digital Interface to Digital Exchange*Japan Radio Co., Ltd., pp. 69–73 (Japan).

Pahlavan et al., *Nonlinear Quantization and the Design of Coded and Uncoded Signal Constellations*, IEEE Transactions on Communications, vol. 39, No. 8, pp. 1207–1215 (Aug. 1991).

Proakis, *Digital Signaling Over a Channel with Intersymbol Interference*, Digital Communications, pp. 373, 381 (McGraw–Hill Book Company, 1983).

Williams et al., *Counteracting the Quantisation Noise from PCM Codecs*, BT Laboratories, pp. 24–29 (UK).

*A Digital Modem and Analogue Modem Pair for Use on the Public Switched Telephone Network (PSTN) at Data Signalling Rates of Up to 56 000 Bits/s Downstream and 33 600 Bit/s Upstream, ITU–T V.90* (Sep. 1998).

*Series V: Data Communications Over the Telephone Network; Interfaces and voiceband modems; A modem operating at data signalling rates of up to 33 600 bit/s for use on the general switched telephone network and on leased point–to–point 2–wire telephone type circuits,ITU–T V.34* (10/96).

Bell, R.A., et al., *Automatic Speed Reduction and Switched Networked Back–up*, IBM Technical Disclosure Bulletin, vol. 32, No. 1, pp. 154–157 (Jun. 1989).

Abbiate, J.C., et al., *Variable–Data Transmission Modem*, IBM Technical Disclosure Bulletin, vol. 17, No. 11, pp. 3301–3301 (Apr. 1975).

*Data Communication Over the Telephone Network; Procedures for Starting Sessions of Data Transmission Over the General Switched Telephone Network, ITU–T V.8* (09/94).

*Line Quality Monitoring Method*, IBM Technical Disclosure Bulletin, vol. 18, No. 8, pp. 2726–2726, (Jan. 1976).

*Loopback Tests for V. 54 Data Communication Equipment*, IBM Technical Disclosure Bulletin, vol. 32, No. 3A, pp. 295–299 (Aug. 1989).

*On–Line Real Time Modem Testing*, IBM Technical Disclosure Bulletin, vol. 20, No. 6, pp. 2252–2254 (Nov. 1977).

Pierobon, Gianfranco L., *Codes of Zero Spectral Density at Zero Frequency*, IEEE Transactions on Information Theory, Vol. IT–30, No. 2, pp. 435–439 (Mar. 1984).

Marcus, Brian H, et al., *On Codes with Spectral Nulls at Rational Submultiples of the Symbol Frequency*, IEEE Transactions on Information Theory, vol. IT–33, No. 4, pp. 557–568 (Jul. 1987).

Fischer, Robert, et al., *Signal Mapping for PCM Modems*, ITU–Telecommunications Standardization Sector PCM '97–120, V.pcm Rapporteur Meeting, (Sunriver, Oregon; Sep. 4–12, 1997).

*Pulse Code Modulation (PCM) of Voice Frequencies, ITU–T*, Recommendation G.711 (Geneva, 1972).

*Series G: Digital Transmission Systems; Terminal equipments—Coding of analogue signals by pulse code modulation; Pulse code modulation (PCM) of voice frequencies, ITU–T*, Recommendation G.711 (Geneva, 1996).

*Data Communication Over the Telephone Network; Error–Correcting Procedures for DCEs Using Asynchronous–to–Synchronous Conversion, ITU–T V.42* (03/93).

*Improvement to Spectral Shaping Technique*, Research Disclosure, V. 41, n415,415111, pp. 1550–1551 (Nov. 1998).

*TIA Standard Draft: North American Telephone Network Transmission Model for Evaluating Analog Client to Digitally Connected Server Modems*, Telecommunications Industry Association, PN3857,Draft 10 (Feb. 1999).

Davis, Gordon T., *DSP and MATLAB implementation of model–based constellation generation* (Sep. 18, 1998).

Woodruff, K.R, et al, *Automatic and Adaptive System and Efficient Communication in Noisy Communication Line Environments*, IBM Technical Disclosure Bulletin, vol. 24, No. 9, pp. 4627–4629 (Feb. 1982).

Godard, D., et al., *Decision Feedback Equalizer Stabilization in Adaptive Mode*, IBM Technical Disclosure Bulletin, vol. 24, No. 11A, pp. 5691–5692 (Apr. 1982).

Borgnis–Desbordes, P., et al., *Variable–Speed Data Transmission*, IBM Technical Disclosure Bulletin, vol. 27 No. 4A, pp. 2269–2270 (Sep. 1984).

Couland, G., et al., *Analog Wrap Self–Test in Modems During Retrain Operations*, IBM Technical Disclosure Bulletin, vol. 28, No. 6, p. 2457 (Nov. 1985).

Maddens, F., *Sixteen–State Forward Convolutional Encoder*, IBM Technical Disclosure Bulletin, vol. 28, No. 6, pp. 2466–2468 (Nov. 1985).

*Remote Modem–Type Self–Learning*, IBM Technical Disclosure Bulletin, vol. 28, No. 6, pp. 2398–2399 (Nov. 1985).

Maddens, F., *Sixteen–State Feedback Convolutional Encoder*, IBM Technical Disclosure Bulletin, vol. 28, No. 10, pp. 4212–4213 (Mar. 1986).

Bell, R. A., et al., *Automatic Speed Reduction and Switched Network Back–up*, IBM Technical Disclosure Bulletin, vol. 32, No. 1, pp. 154–157 (Jun. 1989).

Nobakht, R.A., *Trellis–Coded Modulation Coding Scheme for a 19/2 Kbps Modem*, IBM Technical Disclosure Bulletin, vol. 36, No. 11, pp. 167–170 (Nov. 1993).

Nobakht, R.A., *Unified Table Based Subset Decoder for the Viterbi Algorithm*, IBM Technical Disclosure Bulletin, vol. 37, No. 09, pp. 581–587 (Sep. 1994).

Nobakht, R.A., *Trellis Subset Decoder Algorithm Based on a Pattern Recognition Scheme*, IBm Technical Disclosure Bulletin, vol. 37, No. 10, pp. 693–697 (Oct. 1994).

Abbiate, J.C., et al, *Variable–Data Transmission Modem*, IBM Technical Disclosure Bulletin, vol. 17, No. 11, pp. 3301–3302 (Apr. 1975).

Barlet, J., et al., *Full Speed Recovery in High Speed Modems*, IBM Technical Disclosure Bulletin, vol. 23, No. 2, pp. 641–643 (Jul. 1980).

Dialog Abstract, *Sample rate converter for duplex modem*, European Patent No. 285413.

Dialog Abstract, *Two–speed full–duplex modem for telephone network*, PCT No. WO 8501407.

Dialog Abstract *Digital data transmission system*, European Patent No. 124674.

Dialog Abstract, *Facsimile communication controller*, Japanese Publication No. 04–175060 (Jun. 23, 1992).

Dialog Abstract, *Picture communication equipment*, Japanese Publication No. 03–120954 (May 23, 1991).

Dialog Abstract, *Radio date transmission system*, Japanese Publication No. 01–179535 (Jul 17, 1989).

Dialog Abstract, *Facsimile device*, Japanese Publication No. 57–164654 (Oct. 9, 1982).

Dialog Abstract, *Data repeater*, Japanese Publication No. 57–087255 (May 31, 1982).

Dialog Abstract, *Blinding training method for decision feedback equaliser having feed-forward and feedback filters*, European Patent No. 880253.

Dialog Abstract, *Processing method for distorted signal received by qam receiver*, European Patent No. 465851.

Dialog Abstract, *Establishing wireless communication channel*, PCT No. WO 9905820.

Dialog Abstract, *High-speed rate adaptive subscriber line digital data modem*, PCT No. WO 9830001.

Dialog Abstract, *Digital modem in digital modulation system*, Japanese Patent No. 8116341.

Dialog Abstract, *Communication equipment and radio communication adapter*, Japanese Publication No. 08–340289 (Dec. 24, 1996).

Dialog Abstract, *Data recording method*, Japanese Publication No. 05–089597 (Apr. 9, 1993).

Dialog Abstract, *Transmission control system for data communication and its modem equipment*, Japanese Publication No. 02–228853 (Sep. 11, 1990).

Naguib, A.F., et al., Dialog Abstract, *A space–time coding modem for high–data–rate wireless communications*, IEEE Journal of Selected Areas in Communications, vol. 16, No. 8, pp. 1459–78 (Oct. 1998).

Denno, S., et al., Dialog Abstract, *Mbit/s burst modem with an adaptive equalizer for TDMA mobile radio communications*, IEICE Transactions on Communications, vol. E81–B, No. 7, pp. 1453–61 (Jul. 1998).

Naguib, A.F., et al., Dialog Abstract, *A space–time coding modem for high–data–rate wireless communications*, GLOBECOM 97, IEEE Global Telecommunications Conference, vol. 1, pp. 102–9 (1997).

Kobayashi, K., et al., Dialog Abstract, *Fully digital burst modem for satellite multimedia communication systems*, IEICE Transactions on Communications vol. E80–B, No. 1, pp. 8–15 (Jan. 1997).

Skellern, D.J., et al., Dialog Abstract, *A high speed wireless LAN*, IEEE Micro, Vol 17, No. 1, pp. 40–47 (Jan.–Feb. 1997).

Enomoto, K., et al., Dialog Abstract, *A mode switching type burst demodulator AFC*, Transactions of the Institute of Electronics, Information and Communication Engineers, vol. J76B–II, No. 5, pp. 415–421 (May 1993).

Betts, W., Dialog Abstract, *Nonlinear encoding by surface projection*, International Conference on Data Transmission—Advances in Modem and ISDN Technology and Applications (Sep. 23–25, 1992).

Schilling, D.L., et al., Dialog Abstract, *The FAVR meteor burst communication experiment*, Military Communications in a Changing World MILCOM '91 (Nov. 4–7, 1991).

Jacobsmeyer, J.M., Dialog Abstract, *Adaptive trellis–coded modulation for bandlimited meteor burst channels*, IEEE Journal on Selected Areas in Communications, vol. 10, No. 3, pp. 550–561 (Apr. 1992).

Sato, T., et al., Dialog Abstract, *Protocol configuration and verification of an adaptive error control scheme over analog cellular networks*, IEEE Transactions on Vehicular Technology, vol. 41, No. 1, pp. 69–76 (Feb. 1992).

Lee, L.–N., et al., Dialog Abstract, *Digital signal processor–based programmable BPSK/QPSK/offset–QPSK modems*, COMSAT Technical Review, pp. 195–234 (Fall 1989).

Sato, T., et al., Dialog Abstract, *Error–free high–speed data modem*, Oki Technical Review, vol. 56, No. 133, pp. 20–26 (Apr. 1989).

Seo, J.–S, et al., Dialog Abstract, *Performance of convolutional coded SQAM in hardlimited satellite channels*, IEEE International Conference on Communications BOSTON-ICC/89, vol. 2, pp. 787–791 (Jun. 11–14, 1989).

Murakama, K., et al., Dialog Abstract, *FEC combined burst–modem for business satellite communications use*, IEEE/IECE Global Telecommunications Conference 1987, vol. 1, pp. 274–280 (Japan, Nov. 15–18, 1987).

McVerry, F., Dialog Abstract, *Performance of a fast carrier recovery scheme for burst–format DQPSK transmission over satellite channels*, International Conference on Digital Processing of Signals in Communications, pp. 165–172 (United Kingdom, 1985).

Filter, J.H.J., Dialog Abstract, *An algorithm for detecting loss of synchronisation in data transmission test sets (modems)*, Transactions of the South African Institute of Electrical Engineers, vol. 76, No. 1, pp. 39–43 (Jan. 1985).

Gersho, A., Dialog Abstract, *Reduced complexity implementation of passband adaptive equlizers*, IEEE Journal on Selected Areas in Communications, vol. SAC–2, No. 5, pp. 778–779 (Sep. 1984).

Dialog Abstract, *High–speed full–duplex modem reduces telephone connect time*, EDN, vol. 27, No. 18, p. 77 (Sep. 15, 1982).

Chadwick, H., et al., Dialog Abstract, *Performance of a TDMA burst modem through a dual nonlinear satellite channel*, Fifth International Conference on Digital Satellite Communications, pp. 63–67 (Italy, Mar. 23–26, 1981).

Nussbaumer, H., Dialog Abstract, *Reducing the acquisition time in an automatic equalizer*, IBM Technical Disclosure Bulletin, vol. 18, No. 5, pp. 1465–79 (Oct. 1975).

Uzunoglu, V., et al., Dialog Abstract, *Synchronous and the coherent phase–locked synchronous oscillators: new techniques in synchronization and tracking*, IEEE Transactions of Circuits and Systems, vol. 36, No. 7, pp. 997–1004 (Jul. 1989).

Minei, I., et al., Dialog Abstract, *High–speed Internet access through unidirectional geostationary satellite channels*, IEEE Journal on Selected Areas in Communications, vol. 17, No. 2, pp. 345–359 (Feb. 1999).

Ovadia, S., Dialog Abstract, *The effect of interleaver depth and QAM channel frequency offset on the performance of multichannel AM–VSB/256–QAM video lightware transmission systems*, International Conference on Telecommunications: Bridging East and West Through Communications, vol. 1, pp. 339–343 (Greece, Jun. 21–25, 1998).

Johnson, R.W., et al., Dialog Abstract, *Error correction coding for serial–tone HG transmission*, Seventh International Conference on HF Radio Systems and Techniques, pp. 80–84 (United Kingdom, Jul. 7–10, 1997).

Karasawa, Y., et al., Dialog Abstract, *Cycle slip in clock recovery on frequency–selective fading channels*, IEEE Transactions on Communications, vol. 45, No. 3, pp. 376–383 (Mach 1997).

Umehira, M., et al., Dialog Abstract, *Design and performance of burst carrier recovery using a phase compensated filter*, Transactions of the Institute of Electronics, Information and Communication Engineers, vol. J78B–II, No. 12, pp. 735–746 (Dec. 1995).

De Bot, P., et al., Dialog Abstract, *An example of multi–resolution digital terrestrial TV modem*, Proceedings of ICC '93—IEEE International Conference on Communications, vol. 3, pp. 1785–90 (Switzerland, May 23–26, 1993).

Lei, Chen, et al., Dialog Abstract, *Single–tone HF high speed data modem*, Proceedings of TENCON '93—IEEE Region 10 International Conference on Computers, Communications and Automation, vol. 3, pp. 94–98 (China, Oct. 19–21, 1993).

Woerner, B.D., et al., Dialog Abstract, *Simulation issues for future wireless modems*, IEEE Communications, vol. 32, No. 7, pp. 42–53 (Jul. 1994).

Sato, T., et al., Dialog Abstract, *Vehicle terminal equipment with dedicatied DSP*, Oki Technical Review, vol. 58, No. 144, pp. 49–52 (Jul. 1992).

Tamm, Yu.A., Dialog Abstract, *The effect of suppressing harmonic interference using an adaptive equalizer*, Elektrosvyaz, vol. 45, No. 3, pp. 5–10 (Mach 1990).

Saleh, A.A.M., et al., Dialog Abstract, *An experimental TDMA indoor radio communications systemusing slow frequency hopping and coding*, IEEE Transactions on Communications, vol. 39, No. 1, pp. 152–162 (Jan., 1991).

Nergis, A., Dialog Abstract, *Optimum HF digital communication systems with block coding and interleaving techniques*, Proceedings of the 1990 Bilkent International Conference on New Trends in Communication, Control and Signal Processing, vol. 1, pp. 511–517 (Turkey, Jul. 2–5, 1990).

Kawamata, F., et al., Dialog Abstract, *An evaluation of voice codecs and facsimiles*, Review of the Communications Research Laboratory, vol. 36, pp. 69–73 (Mar. 1990).

Sato, T., et al., Dialog Abstract, *Error–free high–speed data transmission protocol simultaneously applicable to both wire and mobile radio channels*, 38$^{th}$ IEEE Vehicular Technology Conference: 'Telecommunications Freedom—Technology on the Move', pp. 489–496 (Jun. 15–17, 1988).

Dialog Abstract, *1200–bit/s cellular modem DLD03H*. Oki Technical Review, vol. 53, No. 127, pp. 70–72 (Jul. 1987).

Chamberlin, J.W., et al., Dialog Abstract, *Design and field test of a 256–QAM DIV modem*, IEEE Journal on Selected Areas in Communications, vol. SAC–5, No. 3, pp. 346–356 (Apr. 1987).

De Cristofaro, R., et al., Dialog Abstract, *A 120Bv/s QPSK modem designed for the INTELSAT TDMA network*, International Journal of Satellite Communications, vol. 3, Nos. 1–2, pp. 145–160 (Jan.Jun., 1985).

Shumate, A., Dialog Abstract, *Error correction coding for channels subject to occasional losses of bit count integrity*, IEEE Military Communications Conference, vol. 1, pp. 89–83 (Otc. 21–24, 1984).

Suyderhoud, H., et al., Dialog Abstract, *Investigation of 9.6 kb/s data transmission via a PCM link at 64 kb/s with and without link errors*, International Journal of Satellite Communications, vol. 2, No. 1, pp. 81–87 (Jan.–Mar., 1984).

Smith, C., Dialog Abstract, *Relating the performance of speech processors to the bit error rate*, Speech Technology, vol. 2, No. 1, pp. 41–53 (Sep.–Oct. 1983).

Suyderhoud, H., et al., Dialog Abstract, *Investigation of 9.6–kbit/s data transmission via a PCM link at 64 kbit/s with and without link errors*, Sixth International Conference on Digital Satellite Communications Proceedings, pp. 26–33 (Sep. 19, 23, 1983).

Kittel, L., Dialog Abstract, *Analogue and discrete channel models for signal transmission in mobile radio*, Frequenz, vol. 36, Nos. 4–5, pp. 153–160 (Apr.–May 1982).

Farrell, P.G., et al., Dialog Abstract, *Soft–decision error control of h.f. data transmission*, IEE Proceedings F (Communications, Radar and Signal Processing), vol. 127, No. 5, pp. 389–400 (Oct. 1980).

Johnson, A.L., Dialog Abstract, *Simulation and implementation of a modulation system for overcoming ionospheric scintillation fading*, AGARD Conference Proceedings No. 173 on Radio Systems and the Ionosphere, pp. 3/1–5 (Greece, May 26–30, 1975).

Matsumura, K., et al., Dialog Abstract, *Anti–interference data–transmission set of HF radio equipment*, Mitsublishi Electric Engineer, No. 41, pp. 18–23 (Sep., 1974).

Blank, H.A., et al., Dialog Abstract, *A Markov error channel model*, 1973 National Telecommunications Conference, vol. 1, pp. 15B/1–8 (Nov. 26–28, 1973).

McGruther, W.G., Dialog Abstract, *Long term error performance data for operation at 2400 bps ona nonswitched private line network*, Summaries of papers presented at 1970 Canadian symposium on communications, pp. 65–66 (Canada, Nov. 12–13, 1970).

Burton, H.O., et al., Dialog Abstract, *On the use of error statistics from data transmission on telephone facilities to estimate performance of forward–error–correction*, 1970 international conference on communications, p. 21 (Jun. 8–10, 1970).

Bowen, R.R., Dialog Abstract, *Application on burst error correction codes to data modems for dispersive channels*, Proceedings of the 1970 international symposium on information theory, p. 1 (Netherlands, Jun. 15–19, 1970).

Pierce, A.W., et al., Dialog Abstract, *Effective application of forward–acting error–control coding to multichannel h.f. data modems*, IEEE Transactions on Communication Technology, vol. Com–18, No. 4, pp. 281–294 (Aug. 1970).

West, R.L., Abstract, *Data Concentration Method*, IBM Technical Disclosure Bulletin, pp. 487–489; http://w3.infogate.ibm.com:1207/SESS506884/GETDOC/39/2/1 (Jul., 1975).

Haas, L.C., et al., Abstract, *Received Line Signal Quality Analysis*, IBM Technical Disclosure Bulletin, pp. 5414–5416; http://w3.infogate.ibm.com:1207/SESS506884/GETDOC/43/1/1 (May, 1981).

Nussbaumer, H., Abstract, *Reducing the Acquisition Time in an Automatic Equalizer*, IBM Technical Disclosure Bulletin, pp. 1465–1479; http://w3.infogate.ibm.com:1207/SESS506884/GETDOC/40/2/1 (Oct. 1975).

Dialog Abstract, *Listener echo canceller for digital communication system*, PCT No WO 9310607.

Dialog Abstract, *Reduced time remote access method for modem computer*, PCT No. WO 9209165.

\* cited by examiner

SYSTEMS, METHODS AND COMPUTER PROGRAM PRODUCTS FOR IDENTIFYING DIGITAL IMPAIRMENTS IN MODEM SIGNALS

FIELD OF THE INVENTION

This invention relates to modems, and more particularly to startup signals and sequences for modems.

BACKGROUND OF THE INVENTION

The demand for remote access to information sources and data retrieval, as evidenced by the success of services such as the World Wide Web, is a driving force for high-speed network access technologies. Today's telephone network offers standard voice services over a 4 kHz bandwidth. Traditional analog modem standards generally assume that both ends of a modem communication session have an analog connection to the Public Switched Telephone Network (PSTN). Because data signals are typically converted from digital to analog when transmitted towards the PSTN and then from analog to digital when received from the PSTN, data rates may be limited to 33.6 kbps as defined in the V.34 transmission recommendation developed by the International Telecommunications Union (ITU).

The need for an analog modem can be eliminated, however, by using the Basic Rate Interface (BRI) of the Integrated Services Digital Network (ISDN). A BRI offers end-to-end digital connectivity at an aggregate data rate of 160 kbps, which is comprised of two 64 kbps B channels, a 16 kbps D channel, and a separate maintenance channel. ISDN can offer comfortable data rates for Internet access, telecommuting, remote education services, and some forms of video conferencing. ISDN deployment, however, has been very slow due at least in part to the substantial investment for new equipment. Because ISDN presently is not very pervasive in the PSTN, the network providers have typically tarriffed ISDN services at relatively high rates, which may be ultimately passed on to the ISDN subscribers. In addition to the high service costs, subscribers must generally purchase or lease network termination equipment to access the ISDN.

While most subscribers do not enjoy end-to-end digital connectivity through the PSTN, the PSTN is nevertheless mostly digital. Typically, the only analog portion of the PSTN is the phone line or local loop that connects a subscriber or client modem (e.g., an individual subscriber in a home, office, or hotel) to the telephone company's Central Office (CO). In recent years, local telephone companies have been replacing portions of their original analog networks with digital switching equipment. Nevertheless, the connection between the home and the CO generally has been the slowest to change to digital as discussed in the foregoing with respect to ISDN BRI service.

A recent data transmission recommendation issued by the ITU, known as V.90, takes advantage of the digital conversions that have been made in the PSTN. By viewing the PSTN as a digital network, V.90 technology is able to accelerate data downstream from the Internet or other information source to a subscriber's computer at data rates of up to 56 kbps, even when the subscriber is connected to the PSTN via an analog local loop.

To understand how the V.90 recommendation achieves this higher data rate, it may be helpful to briefly review the operation of V.34 analog modems. V.34 modems are optimized for the situation where both ends of a communication session are connected to the PSTN by analog lines. Even though most of the PSTN is digital, V.34 modems treat the network as if it were entirely analog. Moreover, the V.34 recommendation assumes that both ends of the communication session suffer impairment due to quantization noise introduced by analog-to-digital converters. That is, the analog signals transmitted from the V.34 modems are sampled at 8000 times per second by a code upon reaching the PSTN, with each sample being represented or quantized by an eight-bit pulse code modulation (PCM) codeword. The code uses 256, non-uniformly spaced, PCM quantization levels defined according to either the $\mu$-law or A-law companding standard (i.e. the ITU G.711 Recommendation).

Because the analog waveforms are continuous and the binary PCM codewords are discrete, the digits that are sent across the PSTN can only approximate the original analog waveform. The difference between the original analog waveform and the reconstructed quantized waveform is called quantization noise, which can limit the modem data rate.

While quantization noise may limit a V.34 communication session to 33.6 kbps, it nevertheless affects only analog-to-digital conversions. The V.90 standard relies on the lack of analog-to-digital conversions in the downstream path, outside of the conversion made at the subscriber's modem, to enable transmission at 56 kbps.

The general environment for which the V.90 standard was developed is depicted in FIG. 1. An Internet Service Provider (ISP) 22 is connected to a subscriber's computer 24 via a V.90 digital server modem 26, through the PSTN 28 via digital trunks (e.g., T1, E1 and/or ISDN Primary Rate Interface (PRI) connections), through a central office switch 32, and finally through an analog loop to the client modem 34. The central office switch 32 is drawn outside of the PSTN 28 to better illustrate the connection of the subscriber's computer 24 and modem 34 into the PSTN 28. It should be understood that the central office 32 generally is, in fact, a part of the PSTN 28. Operation of a communication session between the subscriber 24 and an ISP 22 is best described with reference to the more detailed block diagram of FIG. 2.

Referring to FIG. 2, transmission from the server modem 26 to the client modem 34 will be described first. The information to be transmitted is first encoded using only the 256 PCM codewords used by the digital switching and transmission equipment in the PSTN 28. These PCM codewords are transmitted towards the PSTN by the PCM transmitter 36 where they are received by a network codec.

The PCM data is then transmitted through the PSTN 28 until reaching the central office 32 to which the client modem 34 is connected. Before transmitting the PCM data to the client modem 34, the data is converted from its current form as either $\mu$-law or A-law companded PCM codewords to Pulse Amplitude Modulated (PAM) voltages by the codec expander (digital-to-analog (D/A) converter) 38. These PAM voltage levels are processed by a central office hybrid 42 where the unidirectional signal received from the codec expander 38 is transmitted towards the client modem 34 as part of a bidirectional signal. A second hybrid 44 at the subscriber's analog telephone connection converts the bidirectional signal back into a pair of unidirectional signals.

Finally, the analog signal from the hybrid 44 is converted into digital PAM samples by an analog-to-digital (A/D) converter 46, which are received and decoded by the PAM receiver 48. Note that for transmission to succeed effectively at 56 kbps, there should be only a single digital-to-analog conversion and subsequent analog-to-digital conversion between the server modem 26 and the client modem 34. Recall that analog-to-digital conversions in the PSTN 28 can introduce quantization noise, which may limit the data rate as discussed hereinbefore. The A/D converter 46 at the client modem 34, however, may have a higher resolution than the A/D converters used in the analog portion of the PSTN 28 (e.g. 16 bits versus 8 bits), which results in less quantization noise. Moreover, the PAM receiver 48 preferably is in synchronization with the 8 kHz network clock to properly decode the digital PAM samples.

Transmission from the client modem 34 to the server modem 26 follows the V.34 data transmission standard. That is, the client modem 34 includes a V.34 transmitter 52 and a D/A converter 54 that encode and modulate the digital data to be sent using techniques such as Quadrature Amplitude Modulation (QAM). The hybrid 44 converts the unidirectional signal from the digital-to-analog converter 54 into a bidirectional signal that is transmitted to the central office 32. Once the signal is received at the central office 32, the central office hybrid 42 converts the bidirectional signal into a unidirectional signal that is provided to the central office codec. This unidirectional, analog signal is converted into either µ-law or A-law companded PCM codewords by the codec compressor (A/D converter) 56, which are then transmitted through the PSTN 28 until reaching the server modem 26. The server modem 26 includes a conventional V.34 receiver 58 for demodulating and decoding the data sent by the V.34 transmitter 52 in the client modem 34. Thus, data is transferred from the client modem 34 to the server modem 26 at data rates of up to 33.6 kbps as provided for in the V.34 standard.

Thus, the V.90 standard offers increased data rates (e.g., data rates up to 56 kbps) in the downstream direction from a server to a subscriber or client. Upstream communication still generally takes place at conventional data rates as provided for in the V.34 standard. Nevertheless, this asymmetry is particularly well suited for Internet access. For example, when accessing the Internet, high bandwidth generally is most useful when downloading large text, video, and audio files to a subscriber's computer. Using V.90, these data transfers can be made at up to 56 kbps. On the other hand, traffic flow from the subscriber to an ISP generally includes mainly keystroke and mouse commands, which are readily handled by the conventional rates provided by V.34.

As described above, the digital portion of the PSTN 28 transmits information using eight-bit PCM codewords at a frequency of 8000 Hz. Thus, it would appear that downstream transmission should take place at 64 kbps rather than 56 kbps as defined by the V.90 standard. While 64 kbps is a theoretical maximum, several factors may prevent actual transmission rates from reaching this ideal rate. First, even though the problem of quantization error can be substantially eliminated by using PCM encoding and PAM for transmission, additional noise in the network or at the subscriber premises, such as non-linear distortion and crosstalk, can limit the maximum data rate. Furthermore, the µ-law or A-law companding techniques generally do not use uniform PAM voltage levels for defining the PCM codewords. The PCM codewords representing very low levels of sound have PAM voltage levels spaced close together. Noisy transmission facilities can prevent these PAM voltage levels from being distinguished from one another thereby causing loss of data. Accordingly, to provide greater separation between the PAM voltages used for transmission, not all of the 256 PCM codewords may be used.

It is generally known that, assuming a convolutional coding scheme, such as trellis coding, is not used, the number of symbols to transmit a certain data rate is given by Equation 1:

$$\text{bps} = R_s \log_2 N_s \qquad \text{EQ.1}$$

where bps is the data rate in bits per second, $R_s$ is the symbol rate, and $N_s$ is the number of symbols in the signaling alphabet or constellation. To transmit at 56 kbps using a symbol rate of 8000, Equation 1 can be rewritten to solve for the number of symbols required as set forth below in Equation 2:

$$N_s = 2^{56000/8000} = 128 \qquad \text{EQ.2}$$

Thus, the 128 most robust codewords of the 256 available PCM codewords generally are chosen for transmission as part of the V.90 standard.

Successful operation of a V.90 receiver may depend on an accurate identification of the reference PAM signaling levels that are often called the signaling alphabet or the signal constellation. The digital samples that are filtered by a decision feedback equalizer are provided to a slicer/detector where the samples are compared against the signaling alphabet. A determination is made with regard to which member of the alphabet or which point in the constellation the digital sample falls closest to. Once the alphabet member is identified, the PCM code word corresponding to that alphabet member is selected as the symbol transmitted for that digital sample.

While a set of ideal signaling levels can be defined for the signaling alphabet, the effective alphabet typically will deviate from these ideal levels because of underlying digital impairments resulting from Robbed Bit Signaling (RBS) and/or digital attenuation PADs. RBS is a mechanism utilized in the digital transport system, such as a T1 trunk, for signal control and status information between network equipment. PAD is similarly found in the digital transport system for the purpose of adjusting signal levels for different analog and digital equipment. Since these impairments will likely be chronic throughout the communication session, it may be more efficient for the modem to learn a new signaling alphabet that takes these impairments into account.

Accordingly, the V.90 standard specifies that during Phase 3 of the startup procedure that is carried out after establishing a dialed connection between the client and server modems, digital impairment learning will take place. During digital impairment learning, a plurality of sets of DIL signals, each corresponding to a set of PCM signals, is repeatedly transmitted from a server modem to a client modem during a corresponding plurality of DIL intervals, also referred to as framing intervals. For example, six DIL intervals may be provided during which all or a selected subset of the PCM levels for the constellation are transmitted. The plurality of DIL intervals may be repeated until the RBS and PAD digital impairments are identified. The PAD and RBS digital impairments so identified are then used in the Phase 4 final training procedures for the V.90 modem.

Unfortunately, the identification of RBS and PAD digital impairments may be difficult because of the many types of RBS and the many levels of PAD digital impairments that may be present in a telephone network. RBS and PAD identification also may be difficult due to the combinations of one or more PADs and/or RBS that may be present in a given network.

For example, RBS can manifest itself when the Least Significant Bit (LSB) of a PCM code word in a particular DIL interval is forced to a one. This operation has the effect of collapsing neighboring PCM code words with even and odd values into the odd value PCM code word. Other types of RBS variations are possible, and different DIL intervals may be subject to different types of RBS.

The effect of PADs generally is present in all six DIL intervals. A PAD also can result in multiple PCM code words collapsing into a single code word. Although this may not cause a problem for voice transmission, it may produce great difficulty for data transmission. PADs generally are not standardized and several quantization rules can be used for implementing a given PAD attenuation.

Accordingly, it is desirable to provide improved systems, methods and/or computer program products for identifying RBS and PAD digital impairments in the DIL signals that are repeatedly transmitted from a server modem to a client modem during a corresponding plurality of DIL intervals.

SUMMARY OF THE INVENTION

The present invention provides systems, methods and/or computer program products that can identify Robbed Bit Signal (RBS) and PAD impairments in a plurality of sets of Digital Impairment Learning (DIL) signals that are repeatedly transmitted from a server modem to a client modem during a corresponding plurality of DIL intervals. Differences, preferably sum of squares of differences, between DIL signals in the plurality of sets and models of DIL signals having combinations of RBS types and PAD levels are computed. For each interval, a model that matches the DIL signals in the DIL interval is selected, to thereby identify RBS and PAD impairment for each DIL interval. Preferably, a model that most closely matches the DIL signals in the interval is selected.

More specifically, one of the DIL intervals that contains DIL signals that are not subject to RBS is identified. A PAD level for the DIL signals in the one of the DIL intervals so identified then is determined. The PAD level that was determined is applied to the DIL signals in remaining ones of the DIL intervals, to identify an RBS for the DIL signals in the remaining ones of the DIL intervals.

Preferably, one of the DIL intervals that contains DIL signals that are not subject to RBS is identified by obtaining a plurality of sets of model DIL signals that correspond to a plurality of PAD levels that are not subject to RBS. The sets of DIL signals in the plurality of DIL intervals are compared to the plurality of sets of model DIL signals that correspond to a plurality of PAD levels that are not subject to RBS. One of the DIL intervals in the plurality of DIL intervals is selected, based on the results of comparing the sets of DIL signals in the plurality of DIL intervals to the plurality of sets of model DIL signals. Preferably, one of the DIL intervals is selected, that contains a set of DIL signals that most closely matches one of the plurality of sets of model DIL signals that correspond to a plurality of PAD levels that are not subject to RBS, to thereby identify one of the DIL intervals that contains DIL signals that are not subject to RBS. In comparing, a sum of squares of differences between the sets of DIL signals in the plurality of DIL intervals and the plurality of sets of model DIL signals that correspond to a plurality of PAD levels that are not subject to RBS, preferably is computed.

A PAD level for DIL signals in the one of the DIL intervals so identified preferably is determined by obtaining a plurality of sets of model DIL signals that correspond to a plurality of PAD levels that are not subject to RBS. The DIL signals in the one of the DIL intervals that was identified is compared to the plurality of sets of model DIL signals that correspond to the plurality of PAD levels that are not subject to RBS. Then, one of the plurality of sets of model DIL signals is selected, based upon the results of comparing the DIL signals in one of the DIL intervals so identified, to the plurality of sets of model DIL signals. Preferably, one of the plurality of sets of model DIL signals is selected, that most closely matches the DIL signals in the one of the DIL intervals so identified, to thereby determine a PAD level for DIL signals in the one of the DIL intervals so identified. Comparing may be performed by computing a sum of squares of differences between the DIL signals in the one of the DIL intervals so identified and the plurality of sets of model DIL signals that correspond to the plurality of PAD levels that are not subject to RBS. The plurality of sets of model DIL signals that correspond to a plurality of PAD levels that are not subject to RBS may be scaled to account for equalizer training in the presence of the corresponding PAD level.

Finally, the PAD so determined may be applied to the DIL signals in remaining ones of the DIL intervals by obtaining a plurality of sets of model DIL signals that correspond to a plurality of RBS types for the PAD that was determined. The DIL signals in the remaining ones of the DIL intervals are compared to the plurality of sets of model DIL signals that correspond to a plurality of RBS types for the PAD so determined. For each of the remaining ones of the DIL intervals, one of the plurality of sets of model DIL signals that correspond to a plurality of RBS types for the PAD so determined is selected, based upon the results of comparing the DIL signals in the remaining ones of the DIL intervals to the plurality of sets of model DIL signals. Preferably, one of the plurality of sets of model DIL signals is selected, that most closely matches the DIL signals in the remaining ones of DIL intervals, to thereby identify an RBS type for the DIL signals in the remaining ones of the DIL intervals. Comparing may be performed by computing a sum of squares of differences between the DIL signals in the remaining ones of the DIL intervals, and the plurality of sets of model DIL signals that correspond to a plurality of RBS types for the PAD so determined. Scaling to account for equalizer training also may be performed.

If, when applying the PAD so determined to DIL signals in remaining ones of the DIL intervals, one of the remaining DIL intervals also is identified as not being subject to RBS, the DIL signals in the original non-RBS DIL interval can be compared to the DIL signals in the one of the remaining DIL intervals. If the DIL signals match, the result may be accepted. If not, a flag may be set to signal a mismatch that can be handled separately. It also will be understood that the identifying, determining and applying that were described above may be applied only to selected ones of the DIL signals in the DIL intervals rather than to all of the DIL signals.

Accordingly, the present invention can provide robust and reliable identification of RBS and PAD digital impairments. It can be scaled to handle as small or as large a set of digital impairments as may be desired for a given set of modem design criteria. Moreover, the present invention need not determine different possible digital impairments one at a time. Rather, an overall combination of digital impairments present in the connection can be directly determined. This can allow for efficient determination. By preferably using a squared distance metric, the effect of noise automatically may be taken into consideration. Thus, the present invention can be robust against random noise and other channel impairments that may be encountered on telephone lines. Finally, less well-known digital impairments may be handled by the present invention using the digital impairment models. It will be understood that the present invention may be provided as modem-related systems, methods and/or computer program products.

DETAILED DESCRIPTION OF PREFERRED EMBODIMENTS

Figure 1:
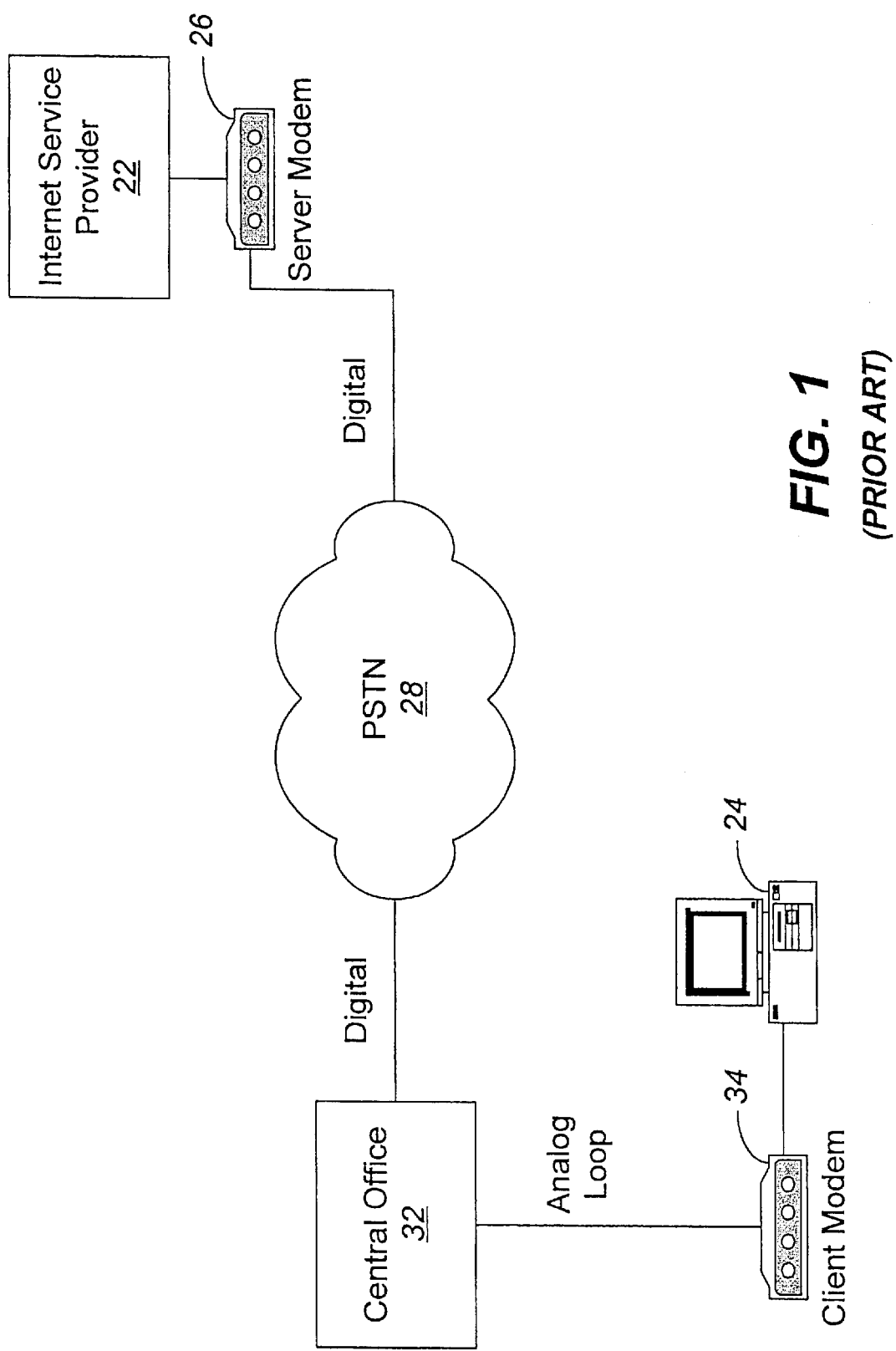
FIG. 1 is a block diagram of a conventional network using client and server modems.
Figure 2:
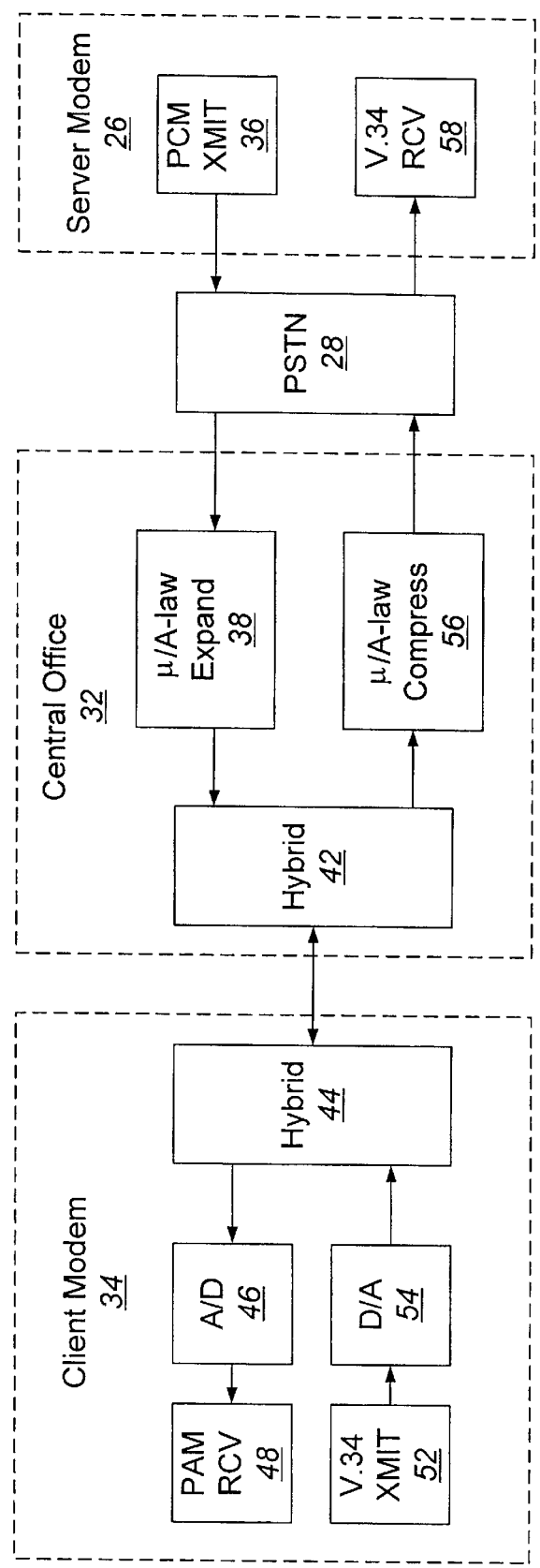
FIG. 2 is a more detailed block diagram of a network of FIG. 1.

The present invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. Like reference numbers signify like elements throughout the description of the figures.

As will be appreciated by those skilled in the art, the present invention can be embodied as a method, a digital signal processing system, and/or a computer program product. Accordingly, the present invention can take the form of an entirely hardware embodiment, an entirely software (including firmware, resident software, micro-code, etc.) embodiment, or an embodiment containing both software and hardware aspects. Furthermore, the present invention can take the form of a computer program product on a computer-usable or computer-readable storage medium having computer-usable program code embodied in the medium for use by or in connection with an instruction execution system. In the context of this document, a computer-usable or computer-readable medium can be any means that an contain, store, communicate, propagate, or transport the program for use by or in connection with the instruction execution system, apparatus, or device.

The computer-usable or computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a Random Access Memory (RAM), a Read-Only Memory (ROM), an Erasable Programmable Read-Only Memory (EPROM or Flash memory), an optical fiber, and a portable Compact Disc Read-Only Memory (CD-ROM). Note that the computer-usable or computer-readable medium could even be paper or another suitable medium upon which the program is printed, as the program can be electronically captured, via, for instance, optical scanning of the paper or other medium, then compiled, interpreted or otherwise processed in a suitable manner if necessary, and then stored in a computer memory.

Computer program code for carrying out operations of the present invention may be written in a high level programming language such as C or C++. Nevertheless, some modules or routines may be written in assembly or machine language to optimize speed, memory usage, or layout of the software or firmware in memory. Assembly language may be used to implement time-critical code segments. In a preferred embodiment, the present invention uses assembly language to implement most software programs. It should further be understood that the program code for carrying out operations of the present invention may also execute entirely on a client modem, partly on a client modem, partly on a client modem and partly on a server modem, or partly in a client modem, partly in a server modem, and partly in the PSTN.

High Level Description

Figure 3:
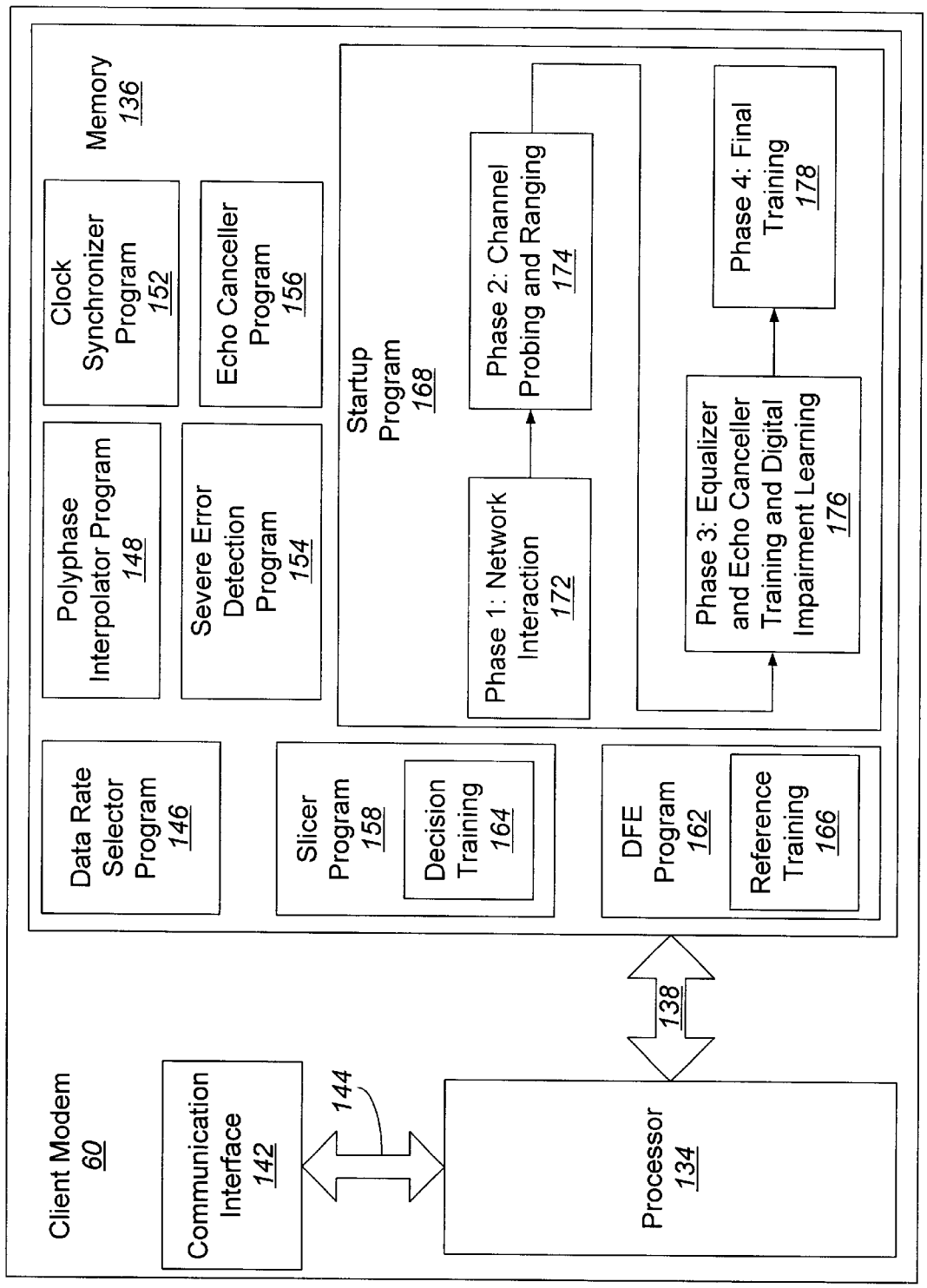
FIG. 3 is a block diagram of a client modem according to an embodiment of the present invention.

Referring now to FIG. 3, a block diagram of a client modem 60 according to the present invention is shown. The client modem 60 includes a processor 134, preferably a digital signal processor, which communicates with a memory 136 via an address/data bus 138. In addition, the processor 134 can receive and transmit information to external devices via a communication interface 142, which is accessed through input/output (I/O) bus 144. The processor 134 can be any commercially available or custom processor, preferably suitable for a real-time intensive embedded application.

The memory 136 is representative of the overall hierarchy of memory devices containing the software and data used to implement the functionality of the V.90 client modem 60. The memory 136 can include, but is not limited to, the following types of devices: cache, ROM, PROM, EPROM, EEPROM, flash, SRAM, and DRAM. As shown in FIG. 3, the memory 136 can include program modules for implementing the functionality of the components of the client modem 60. Preferably, the memory 136 can include a data rate selector program module 146, a polyphase interpolator program module 148, a clock synchronizer program module 152, a severe error detector program module 154, an echo canceller program module 156, a slicer program module 158, and a Decision Feedback Equalizer (DFE) program module 162. The slicer program module 158 and the DFE program module 162 preferably include a decision training program sub-module 164 and a reference training program sub-module 166 respectively, which are used for signaling alphabet identification. These program modules and sub-modules can operate independent of the present invention, and need not be described further herein.

The memory 136 further includes a startup program module 168 which implements the multi-phase startup protocol defined in the V.90 recommendation. More specifically, the startup program module 168 includes a Phase 1: Network Interaction module 172 and a Phase 2: Channel Probing and Ranging module 174. These modules are described in the V.90 standard, and need not be described further herein. As also shown in FIG. 3, a Phase 3: Equalizer and Echo Canceller Training and Digital Impairment Learning module 176 is provided. As will be described in detail below, the present invention can provide improved digital impairment learning for the Phase 3 module 176. Finally, a Phase 4: Final Training module 178 is provided, as is described in the V.90 specification. Other modules also may be included in the startup program 168, which need not be described in detail herein.

The present invention is described with reference to block diagrams and flowchart illustrations of methods, apparatus (systems), and computer program products according to an embodiment of the invention. It will be understood that each block of the block diagrams and flowchart illustrations, and combinations of blocks, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the block or blocks.

These computer program instructions may also be stored in a computer-usable or computer-readable memory that can direct a computer or other programmable data processing apparatus to function in a particular manner, such that the instructions stored in the computer-usable or computer-readable memory produce an article of manufacture including instruction means that implement the function specified in the block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the block or blocks.

During startup of a V.90 modem, the analog modem receiver performs signaling alphabet identification. This can be performed, for example, during DIL signal reception, in which pre-specified signal levels are received in each of a plurality, such as six, of DIL intervals. The learned signal levels (and the corresponding ucodes) may be stored in memory for use in determining the combination of digital impairments present in the network. The digital impairments of interest include PADs and RBS impairments. The PAD level and the type of RBS can also be determined.

In the digital network, the PAD and RBS impairments can be encountered in a variety of combinations, which can change from connection to connection. In a particular DIL interval, one can encounter no PAD and no RBS, RBS only, PAD only, RBS followed by PAD, PAD followed by RBS, RBS followed by PAD followed by RBS and/or multiple PADs with possible RBS before, between, and/or after PADs. Multiple PADs also are referred to as tandem PADs. Note that typically, PADs affect all six DIL intervals in the same manner, while different RBS types can be present in different DIL intervals.

Digital tandem PADs can exist in a telephone network due, for example, to the wide existence of private PBX systems. A PBX system may apply a digital PAD either without the knowledge of or ignoring the fact that there is already a digital PAD in the digital link at the central office. Examples of tandem digital PADs found in the North American telephone networks due to the existence of PBX systems are: 2.055 dB/2.055 dB, 6.02 dB/6.02 dB, and 3.01 dB/6.02 dB, etc. Table 1 shows a list of possible single PADs which may exist in a network connection. Note that for computational convenience, Table 1 contains two 16 bit entries for each possible PAD, the PAD value in dB, and the corresponding linear attenuation. Table 2 shows multiple PADs in tandem that were detected in an actual network.

Table 3 shows a more extensive list of hypothetical tandem PADs that may arise in a network.

TABLE 1

| | |
|---|---|
| dd 1w 24249 | 2.615 dB linear |
| dd 1w 5356 | 2.615 dB |
| dd 1w 32767 | 0.00 dB linear |
| dd 1w 0 | 0.00 dB |
| dd 1w 29205 | 1.00 dB linear |
| dd 1w 2048 | 1.00 dB |
| dd 1w 27571 | 1.50 dB linear |
| dd 1w 3072 | 1.50 dB |
| dd 1w 26789 | 1.75 dB linear |
| dd 1w 3584 | 1.75 dB |
| dd 1w 25864 | 2.055 dB linear |
| dd 1w 4209 | 2.055 dB |
| dd 1w 26028 | 2.00 dB linear |
| dd 1w 4096 | 2.00 dB |
| dd 1W 25290 | 2.25 dB linear |
| dd 1w 4608 | 2.25 dB |
| dd 1w 24574 | 2.50 dB linear |
| dd 1w 5120 | 2.50 dB |
| dd 1w 23170 | 3.0103 dB linear |
| dd 1w 6165 | 3.0103 dB |
| dd 1w 23198 | 3.00 dB linear |
| dd 1w 6144 | 3.00 dB |
| dd 1w 21279 | 3.75 dB linear |
| dd 1w 7680 | 3.75 dB |
| dd 1w 20675 | 4.00 dB linear |
| dd 1w 8192 | 4.00 dB |
| dd 1w 20089 | 4.25 dB linear |
| dd 1w 8704 | 4.25 dB |
| dd 1w 19519 | 4.50 dB linear |
| dd 1w 9216 | 4.50 dB |
| dd 1w 18965 | 4.75 dB linear |
| dd 1w 9728 | 4.75 dB |
| dd 1w 18427 | 5.00 dB linear |
| dd 1w 10240 | 5.00 dB |
| dd 1w 17904 | 5.25 dB linear |
| dd 1w 10752 | 5.25 dB |
| dd 1w 16384 | 6.0206 dB linear |
| dd 1w 12330 | 6.0206 dB |
| dd 1w 16423 | 6.00 dB linear |
| dd 1w 12288 | 6.00 dB |
| dd 1w 14637 | 7.00 dB linear |
| dd 1w 14336 | 7.00 dB |
| dd 1w 13045 | 8.00 dB linear |
| dd 1w 16384 | 8.00 dB |
| dd 1w 11627 | 9.00 dB linear |
| dd 1w 18432 | 9.00 dB |
| dd 1w 10362 | 10.00 dB linear |
| dd 1w 20480 | 10.00 dB |
| dd 1w 9235 | 11.00 dB linear |
| dd 1w 22528 | 11.00 dB |
| dd 1w 8231 | 12.00 dB linear |
| dd 1w 24576 | 12.00 dB |
| padTableSize dd 1w 26 | Number of two word records in padTable |
| ;v90040199 | |

TABLE 2

| PAD#1 | PAD#2 |
|---|---|
| 2.055 dB | 2.055 dB |
| 6.021 dB | 6.021 dB |
| 6.00 dB | 4.00 dB |

TABLE 3

| PAD#1 | PAD#2 |
|---|---|
| 2.00 dB | 2.00 dB |
| 2.00 dB | 3.00 dB |
| 2.00 dB | 4.00 dB |

TABLE 3-continued

| PAD#1 | PAD#2 |
|---|---|
| 2.00 dB | 5.00 dB |
| 2.00 dB | 6.00 dB |
| 3.00 dB | 2.00 dB |
| 3.00 dB | 3.00 dB |
| 3.00 dB | 4.00 dB |
| 3.00 dB | 5.00 dB |
| 3.00 dB | 6.00 dB |
| 4.00 dB | 2.00 dB |
| 4.00 dB | 3.00 dB |
| 4.00 dB | 4.00 dB |
| 4.00 dB | 5.00 dB |
| 4.00 dB | 6.00 dB |
| 5.00 dB | 2.00 dB |
| 5.00 dB | 3.00 dB |
| 5.00 dB | 4.00 dB |
| 5.00 dB | 5.00 dB |
| 5.00 dB | 6.00 dB |
| 6.00 dB | 2.00 dB |
| 6.00 dB | 3.00 dB |
| 6.00 dB | 4.00 dB |
| 6.00 dB | 5.00 dB |
| 6.00 dB | 6.00 dB |

Figure 4:
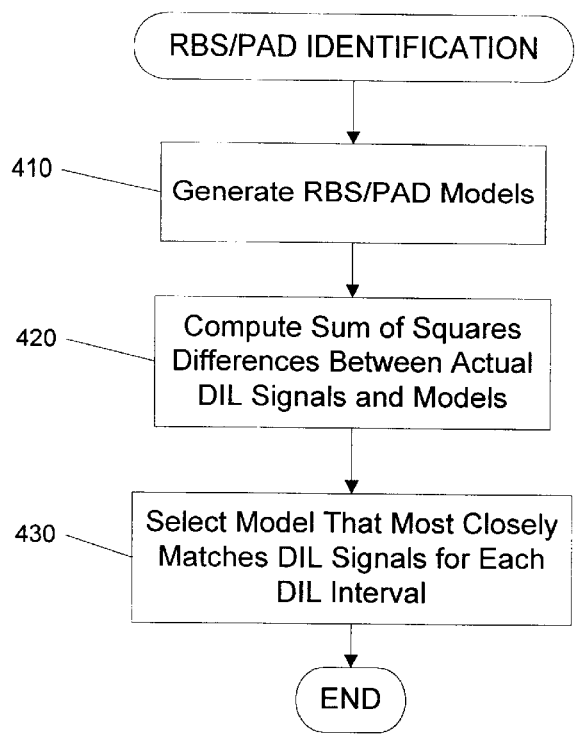
FIG. 4 is a flowchart illustrating operations for identifying RBS and PAD digital impairments according to a first embodiment of the present invention.

FIG. 4 is a flowchart illustrating overall operations for identifying RBS and AD digital impairments in a plurality of sets of DIL signals that are repeatedly transmitted from a server modem to a client modem 60 during the Phase 3 processing 176 of FIG. 3, according to an embodiment of the present invention. As shown in FIG. 4, a plurality of RBS/PAD models are generated at Block 410. In particular, the range of values of PADs that can be encountered are stored in a table and/or determined computationally, for example by specifying the minimum and maximum values and an increment that is repeatedly added to the minimum to generate all the intermediate values. Note however that the precise quantization rule used in a particular PAD implementation may not be known. The possible types of RBS are assumed to be known.

Then, referring to Block 420, differences, such as sum of squares of differences, between actual DIL signals and the models of the DIL signals having combinations of RBS types and PAD levels, are determined. As shown in Block 430, for each interval, a model is selected based on the computation. Preferably, the model that most closely matches the DIL signals is selected. For example, the model with the smallest sum of squares of differences is selected for that DIL interval.

It will be understood that the operations of FIG. 4 need not be completed over one set or frame of six DIL intervals. Rather, the V.90 startup protocol can allow a design sufficient time to continue receiving the DIL sequences while searching the model space using refined DIL averages. Once a model match has been determined, the client V.90 modem can signal the server to terminate the DIL sequences. Thus, startup duration may be traded off against computational burden on the processor searching the entire model space.

Figure 5:
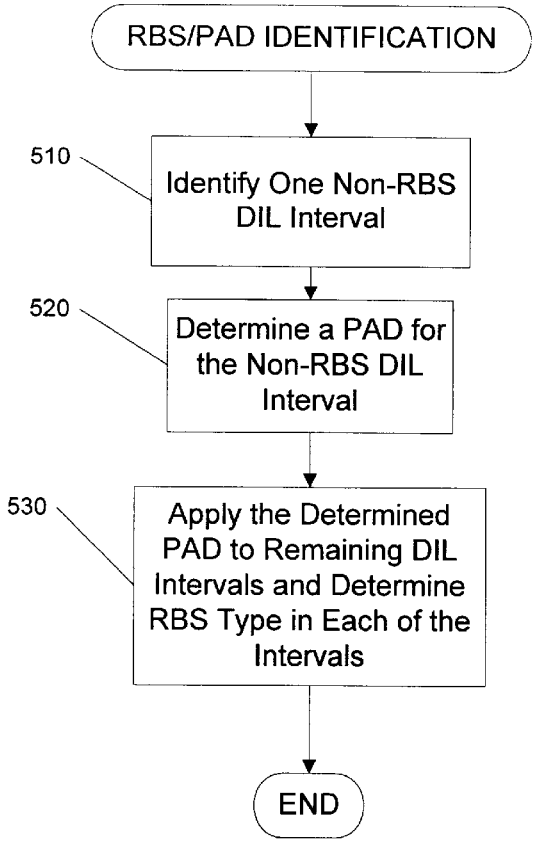
FIG. 5 is a flowchart illustrating operations for identifying RBS and PAD digital impairments according to a second embodiment of the present invention.

FIG. 5 is a flowchart illustrating operations for identifying RBS and PAD digital impairments in a plurality of sets of DIL signals that are repeatedly transmitted from the server modem to a client modem during a corresponding plurality of DIL intervals, according to a second embodiment of the present invention. As shown in FIG. 5, one of the DIL intervals that contains DIL signals that are not subject to RBS (a "non-RBS DIL interval") is identified from among the plurality, such as six, of sets of DIL signals. Then, as shown in Block 520, a PAD is determined for the non-RBS DIL interval. In other words, the learned levels are used in the non-RBS interval to determine the PAD level. Finally, at Block 530, the determined PAD level is applied to the DIL signals in the remaining ones of the DIL intervals, to identify an RBS type for the DIL signals in the remaining ones of the DIL intervals. In other words, using the PAD information, the type of RBS present in each of the DIL intervals may be determined.

Accordingly, a PAD level is first identified for the DIL intervals, preferably using model DIL signals that correspond to non-RBS PAD levels. Then, an RBS type is identified for individual DIL intervals, preferably using model DIL signals that correspond to multiple RBS types for the identified PAD level.

One non-RBS DIL interval may be identified at Block 510 by obtaining sets of model DIL signals that correspond to multiple PAD levels that are not subject to RBS. These model DIL signals then may be compared to the sets of DIL signals in the DIL intervals. One of the DIL intervals may be selected, preferably the DIL interval that contains DIL signals that most closely match a set of model DIL signals, to thereby identify one of the DIL intervals that contains non-RBS DIL signals. A sum of squares may be used to compare the model non-RBS DIL signals to the actual DIL signals in each DIL interval.

In Block 520, a PAD level for the non-RBS DIL interval may be determined by obtaining a plurality of sets of model DIL signals that correspond to a plurality of non-RBS PAD levels. The DIL signals in the one of the DIL intervals so identified may be compared to the plurality of sets of model DIL signals. One of the sets of model DIL signals is selected, based on the comparison. Preferably, the set of model DIL signals that most closely matches the DIL signals is selected, to thereby determine a PAD level for the non-RBS DIL signals.

Finally, at Block 530, in order to apply the determined PAD to the remaining DIL intervals, a plurality of sets of model DIL signals, that corresponds to a plurality of RBS types for the PAD so determined, is obtained. The DIL signals in the remaining ones of the DIL intervals are compared with the model DIL signals. One of the sets of model DIL signals is selected, preferably based upon a closest match, to thereby identify an RBS type for DIL signals in the remaining ones of the DIL intervals.

It will be understood that in the above-described embodiments, the values of PADs and RBS levels to be used may be dynamically specified based on various criteria such as quality of connection, estimates for attenuation from Phase 2 of startup and/or other criteria. Moreover, not all of the DIL signals need to be used to perform the comparison. Rather, only a subset of the DIL signals in the DIL intervals may be used to determine the digital impairments. Thus, for example, the lowest values of the DIL signals that may be overpowered by noise and the highest values of the DIL signals that may be subject to distortion, need not be used for testing.

More specifically, the minimum distance measurement for determining digital impairments may be performed using only a subset of the learned signal levels. A preferred embodiment may specify the subset by setting a minimum ucode and a maximum ucode. Only the signal levels corresponding to within and including the minimum and maximum ucodes may be used in the minimum distance measurement. A reason for selecting the minimum ucode is to exclude the very low signal levels where noise may be dominant. On the other hand, selecting the maximum ucode may exclude some of the very high signal levels which may contain large nonlinear distortion. It also is possible to provide nonlinear distortion measurement which may be used to measure the nonlinear distortion for the high level ucodes and determine the maximum ucode dynamically for each connection.

Finally, if Block 530 determines that one of the remaining ones of the DIL intervals also is not subject to RBS, i.e. there is more than one non-RBS interval, the DIL signals in the initially identified non-RBS interval may be compared to DIL signals in a subsequently identified non-RBS DIL interval. Stated differently, the non-RBS interval detected in Block 510 may be compared to a non-RBS interval or intervals that are detected at Block 530. If these match, then the results of RBS/PAD identification may be accepted. Otherwise, a flag may be set to signal a mismatch that can be handled separately.

Intermediate Level Description

Each of Blocks 510–530 will now be described at an intermediate level.

Non-RBS interval identification (Block 510)-Processing in this block assumes that at least one of the signaling intervals has no RBS present. The following operations may be performed:

for each signaling interval I,
    for each PAD value p,
        compute ideal signal levels assuming no RBS before or after PAD
        compute the sum of squares of the difference between the ideal signal level and learned signal levels
    end
end
Select the interval with the smallest sum of squares as the non-RBS interval.

PAD determination (Block 520)-Using the learned signal levels in the detected non-RBS interval, the value of the digital attenuation PAD may be determined as follows:

for each PAD value p
    compute the ideal signal levels assuming no RBS and PAD value p
    scale the ideal signal levels to account for the equalizer training in the presence of PAD p
    compute the sum of squares of the difference between the learned levels and a scaled ideal value
end
Select the PAD value pad_result corresponding to the smallest sum of squares as the detected PAD value.

Figure 6:
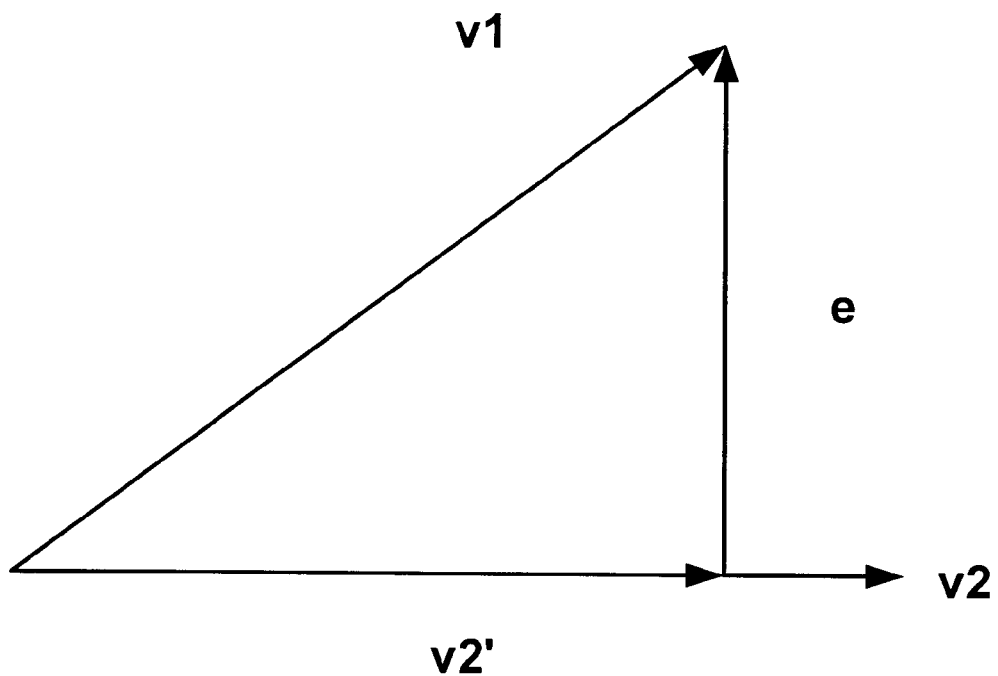
FIG. 6 graphically illustrates use of a scale factor according to the present invention.

The scale factor s for use in Block 520 may be obtained as follows: Form a first vector $v_1$ from the learned signal levels, sorted according to increasing ucode values. Form a second vector $v_2$ from the ideal signal levels corresponding to the PAD value under consideration. Project $v_1$ on $v_2$ orthogonally, yielding $v_2'=S \cdot v_2$, and determine $\|e\|^2$, where $e=v_1-v_2'$, and $\|.\|^2$ is the sum of squares of the components of the argument vector. Minimizing $\|e\|^2$ with respect to a scale factor alpha yields the scale factor $s=v_1 \cdot v_2'/\|v_2\|^2$, wherein the '.' in the numerator indicates the dot product. FIG. 6 illustrates this concept using two-dimensional vectors. Note that in a preferred embodiment, the vectors generally will have a much larger dimension.

RBS detection (Block 530)-Using the detected PAD value, the type of RBS present in each signaling interval may be determined as follows:

for each signaling interval I,
    for each RBS type c,
        compute the ideal signal levels assuming PAD value pad_result
        scale the ideal signal levels to account for the equalizer training in the presence of the PAD
        compute the sum of squares of the difference between the learned levels, and a scaled ideal value
    end
    select the PAD/RBS combination corresponding to the smallest sum of squares
end Based on the outcome of these three blocks, a PAD value and an RBS type for each interval are selected as the model of the digital impairments present in the network during this particular connection.

Detailed Implementation

The following pseudocode describes a detailed implementation for an embodiment of Blocks 510, 520 and 530 of FIG. 5.

```
Non-RBS Interval Identification (Block 510):
; *************************************************************
;
; Begin: padmode==1:
;   Determine a non-RBS interval for findpad( ).
;
; short int c_pad_nrbs =
  {6652,6140,4604,4092,3004,2236,1564,924,292};
;
;   min_dist=2^16-1;
;   for (i=0 ; i<NUM_PAD_GAINS ; ++i) {
;
;     pad_gain=10^(-attnDB(i)/20);
;     TRN2scale=3772/(4*pcmexp(pcmcomp(3772*pad_gain/4)));
;
;     for (j=0 ; j < 6 ; ++j) {
;
;       for (k=0 ; k < SIZE_CONST ; ++k) {
;
;         c_pad_nrbs(k)=4*pcmexp(pcmcomp(c_pad_nrbs(k)*
            pad_gain/4));
;         c_pad_nrbs(k)=c_pad_nrbs(k)*TRN2scale;
;       }
;
;       dist=0;
;       for (k=0 ; k < SIZE_CONST ; ++k)
;         dist=dist+abs(TRN18level(j,k)-c_pad_nrbs(k));
;
;       if (dist < min_dist) {
;
;         min_dist=dist;
;         interval=j;
;       }
;     }
;   }
PAD Determination (Block 520):
; *************************************************************
;
; Begin: padmode==2: Compute digital gain value that generates the
;         closest match between learned constellation and computed
;         constellation.
;
;   min_dist=2^32-1;
;   for (i=0 ; i<NUM_PAD_GAINS ; ++i) {
;
;     pad_gain=10^(-attnDB/20);
;
;     /* compute constellation for given pad gain after
;        companding/expanding */
;
;     for (j=0 ; j < CONST_SIZE ; ++j) {
```

```
;       if (mulaw)
;           c_x_lin(j)=4*pcmexp(pcmcomp(c_npad_nrbs(k)*
;               pad_gain/4));
;       else
;           c_x_lin(j)=8*pcmexp(pcmcomp(c_npad_nrbs(k)*
;               pad_gain/8));
;       }
;
;   /* compute sum(c_lin[i]*c_x_lin[i]) and
;       sum(c_x_lin[i]^2) */
;
;   for (j=0 ; j<SIZE_CONST ; ++j) {
;       sum_num+=c_lin(j)*c_x_lin(j);
;       sum_denom+=c_x_lin(j)*c_x_lin(j);
;       }
;
;   /* compute gain term */
;
;   alpha=sum_num/sum_denom;
;
;   /* compute error for given digital gain pad */
;
;   for (j=0 ; j<SIZE_CONST ; ++j)
;       error+=(c_lin(j)-alpha*c_x_lin(j))^2;
;
;   /* find pad gain with minimum error */
;
;   if (error < min_dist)
;       pad_detected=attnDB(i);
;   }
RBS Detection (Block 530):
; ***********************************************************
; Begin: padmode > 2: Calculate the RBS type for each interval in
  the 6T frame.
;
; /* Compute linear values for each of 6 RBS combinations given
  the digital */
; /* pad detected:                                          */
; /* 0.) No RBS                                             */
; /* 1.) 1-RBS before PAD                                   */
; /* 2.) 1-RBS at codec, after PAD                          */
; /* 3.) ½ RBS at codec, after PAD                          */
; /* 4.) 0-RBS at codec, after PAD                          */
; /* 5.) ½ RBS at codec, before PAD                         */
; /* 6.) 0-RBS before PAD                                   */
; /* 7.) 1-RBS before PAD followed by 1-RBS at codec,
  after PAD: compound rbs */
;
; /* Case 0: no RBS    */
;
; for (j=0 ; j < CONST_SIZE ; ++j) {
;   RBScase(0,j)=4*pcmexp(g711gpcm(c_in(j)));
;   RBScase(0,j)=4*pcmexp(pcmcomp(RBScase(0,j)*padgain/4));
;   }
;
; /* Case 1: 1-RBS before PAD    */
;
; for (j=0 ; j < CONST_SIZE; ++j) {
;   RBScase(1,j)=4*pcmexp(g711gpcm(c_in(j)+1-rem(c_in(j),2)));
;   RBScase(1,j)=4*pcmexp(pcmcomp(RBScase(1,j)*padgain/4));
;   }
;
; /* Case 2: 1-RBS at codec, after PAD    */
;
; for (j=0 ; j < CONST_SIZE; ++j) {
;   RBScase(2,j)=
;       gpcmg711(pcmcomp(pcmexp(g711gpcm(c_in(j)))*padgain)));
;   RBScase(2,j)=
;       4*pcmexp(g711gpcm(RBScase(2,j)+1-rem(RBScase(2,j),2)));
;   }
;
; /* Case 3: ½ RBS at codec, after PAD    */
;
; for (j=0 ; j < CONST_SIZE; ++j) {
;   RBScase(3,j)=
;       gpcmg711(pcmcomp(pcmexp(g711gpcm(c_in(j)))*padgain)));
;   pcm_pad0=RBScase(3,j) - rem(RBScase(3,j),2);
;   pcm_pad1=pcm_pad0 + 1;
;   RBScase(3,j)=4*(pcmexp(g711gpcm(pcm_pad0(j))) +
    pcmexp(g711gpcm(pcm_pad1(j))))/2;
;   }
;
; /* Case 4: 0-RBS at codec, after PAD    */
;
; for (j=0 ; j < CONST_SIZE; ++j) {
;   RBScase(4,j)=
;       gpcmg711(pcmcomp(pcmexp(g711gpcm(c_in(j)))*padgain)));
;   RBScase(4,j)=
;       4*pcmexp(g711gpcm(RBScase(4,j)-rem(RBScase(4,j),2)));
;   }
;
; /* Case 5: ½ RBS at codec, before PAD    */
;
; for (j=0 ; j < CONST_SIZE; ++j) {
;   pcm0(j)=c_in(j) - rem(c_in(j),2);
;   pcm1(j)=pcm0(j) + 1;
;   RBScase(5,j) = (pcmexp(g711gpcm(pcm0(j))) +
    pcmexp(g711gpcm(pcm1(j))))/2;
;   RBScase(5,j)=4*pcmexp(pcmcomp(RBScase(5,j)*padgain));
;   }
;
; /* Case 6: 1-RBS before PAD    */
;
; for (j=0 ; j < CONST_SIZE; ++j) {
;   RBScase(6,j)=4*pcmexp(g711gpcm(c_in(j)-1+rem(c_in(j),2)));
;   RBScase(6,j)=4*pcmexp(pcmcomp(RBScase(6,j)*padgain/4));
;   }
;
; /* Case 7: 1-RBS before PAD, 1-RBS at codec, after PAD:
    compound RBS
*/
;
; for (j=0 ; j < CONST_SIZE; ++j) {
;   RBScase(6,j)=RBScase(1,j)/4;
;   RBScase(6,j)=gpcmg711(pcmcomp(RBScase(6,j)*padgain));
;   RBScase(6,j)=
;       4*pcmexp(g711gpcm(RBScase(6,j)+1 -rem(RBScase(6,j),2)));
;   }
;
; for (j=0 ; j < 7; ++j){
;   min_dist=0;
;   for (k=0 ; k < 7 ; ++k){
;       dist=0;
;       for (l=0 ; l < MTRN1D+NDIL ; ++l)
;           dist=dist+(PCMlevel(j,1)-RBScase(k,1))^2;
;       if(dist < min_dist)
;           RBStype(j)=k;
;   }
; }
```

Less common digital impairments may be handled according to the invention by storing a digital impairment model. Examples of less common impairments include the 0-RBS type where the robbed bit signaling bit is set to 0 to indicate off-hook, rather than setting it to 1. Another example is a so called 1/2-RBS type in which an average between the linear values associated with two adjacent ucodes or PCM code words is computed as the output to the D/A converter, rather than forcing the RBS output value to be based strictly on a 1-RBS or a 0-RBS. Another possible case is where the robbed bit is alternately forced to 0 and 1.

Other less common cases can include ill-behaved digital attenuators such as found on networks in Raleigh, N.C. in which the lower 6 uchords are spaced according to a normal $\mu$-law conversion characteristic, and then there is an abnormal jump in levels to the final 2 uchords. Cases of compound RBS can be determined in which there is an RBS before a PAD and an RBS after a PAD in the one or more framing intervals. This can lead to a "hidden" RBS which hides behind another RBS but which can have an impact on optimum performance of the PCM modem.

There also may be cases of tandem PADs where a PBX incorporates one digital attenuator PAD without knowledge of a PAD in the network. This can lead to two digital attenuator PADs in cascade or tandem with one another between the server and client PCM modem.

Lastly, transcoding scenarios may occur where an Alaw to µlaw coding translation can take place. Double transcoding, where the PCM code words pass through an Alaw to µlaw and then µlaw to Alaw code translation in the digital network, also may occur. Double transcoding may be found on South Korean networks which employ US based telecommunications equipment in the backbone communications network, but which switch back to Alaw at the central office, and which originate with Alaw at an Internet Service Provider (ISP).

While each of the above less common cases may be difficult to handle without prior knowledge, once known they can be accommodated by adding them to the models of DIL signals that are searched according to the invention. Because the models can be based on a complete understanding of what is happening in the network, the effective squared distance can be very small and can lead to reliable determination of digital impairments. Accordingly, a PCM modem developer can define more, and more precise, models of network scenarios and add these models to the search space. The more precise the model, the more likely one can match that model even under noisy line conditions, assuming enough levels or dimensions are available for the distance squared. Reliable and robust identification of digital impairments in PCM modems thereby may be provided.

The flow charts of FIGS. 4 and 5 illustrated the architecture, functionality and operation of a possible implementation of the Phase 3 Digital Impairment Learning software 176. In this regard, each block can represents a module, segment, or portion of code, which can comprise one or more executable instructions for implementing the specified logical function(s). It should also be noted that in some alternative implementations, the functions noted in the blocks may occur out of the order noted in the figures. For example, two blocks shown in succession may in fact be executed substantially concurrently or the blocks may sometimes be executed in the reverse order, depending upon the functionality involved.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A method of identifying Robbed Bit Signaling (RBS) and PAD digital impairments in a plurality of sets of Digital Impairment Learning (DIL) signals that are repeatedly transmitted from a server modem to a client modem during a corresponding plurality of DIL intervals, the method comprising the steps of:

identifying one of the DIL intervals that contains DIL signals that are not subject to RBS;

determining a PAD level for the DIL signals in the one of the DIL intervals so identified; and applying the PAD level so determined to the DIL signals in remaining ones of the DIL intervals, to identify an RBS type for the DIL signals in the remaining ones of the DIL intervals.

2. A method according to claim 1 wherein the step of identifying comprises the steps of:

obtaining a plurality of sets of model DIL signals that correspond to a plurality of PAD levels that are not subject to RBS;

comparing the sets of DIL signals in the plurality of DIL intervals to the plurality of sets of model DIL signals; and selecting one of the DIL intervals in the plurality of DIL intervals, based on results of the step of comparing, to thereby identify one of the DIL intervals that contains DIL signals that are not subject to RBS.

3. A method according to claim 2 wherein the step of comparing comprises the step of computing a sum of squares of differences between the sets of DIL signals in the plurality of DIL intervals and the plurality of sets of model DIL signals.

4. A method according to claim 2 wherein the step of selecting comprises the step of selecting one of the DIL intervals in the plurality of DIL intervals that contains the DIL signals that most closely match one of the sets of model DIL signals.

5. A method according to claim 1 wherein the step of determining a PAD level comprises the steps of:

obtaining a plurality of sets of model DIL signals that correspond to a plurality of PAD levels that are not subject to RBS;

comparing the DIL signals in the one of the DIL intervals so identified to the plurality of sets of model DIL signals; and selecting one of the plurality of sets of model DIL signals based on results of the step of comparing, to thereby determine a PAD level for the DIL signals in the one of the DIL intervals so identified.

6. A method according to claim 5 wherein the step of comparing comprises the step of computing a sum of squares of differences between the model DIL signals.

7. A method according to claim 5 wherein the step of selecting comprises the step of selecting one of the plurality of sets of model DIL signals that most closely matches the DIL signals in the one of the DIL intervals so identified.

8. A method according to claim 5 wherein the plurality of sets of model DIL signals are scaled to account for equalizer training in the presence of the corresponding PAD level.

9. A method according to claim 1 wherein the step of applying comprises the steps of:

obtaining a plurality of sets of model DIL signals that correspond to a plurality of RBS types for the PAD so determined;

comparing the DIL signals in the remaining ones of the DIL intervals to the plurality of sets of model DIL signals; and for each of the remaining ones of the DIL intervals, selecting one of the plurality of sets of model DIL signals, based on results of the step of comparing, to thereby identify an RBS type for the DIL signals in the remaining ones of the DIL intervals.

10. A method according to claim 9 wherein the step of comparing comprises the step of computing a sum of squares of differences between the DIL signals in the remaining ones of the DIL intervals and the plurality of sets of model DIL signals.

11. A method according to clam 9 wherein the step of selecting comprises the step of selecting one of the plurality of sets of model DIL signals that most closely matches the DIL signals in the remaining one of the DIL intervals.

12. A method according to claim 9 wherein the plurality of sets of model DIL are scaled to account for equalizer training in the presence of the PAD so determined.

13. A method according to claim 1 wherein the following step is performed if the applying step identifies one of the remaining ones of the DIL intervals as not subject to RBS:

comparing the DIL signals in the one of the DIL intervals to the DIL signals in the one of the remaining ones of the DIL intervals.

14. A method according to claim 1 wherein the steps of identifying, determining and applying are performed only on selected ones of the DIL signals in the DIL intervals.

15. A method of identifying Robbed Bit Signaling (RBS) and PAD digital impairments in a plurality of sets of Digital Impairment Leaning (DIL) signals that are repeatedly transmitted from a server modem to a client modem during a corresponding plurality of DIL intervals, the method comprising the steps of:
- generating the models of DIL signals having combinations of RBS types and PAD levels;
- computing sums of squares of differences between selected ones of the DIL signals in the plurality of sets and model DIL signals having combinations of RBS types and PAD levels; and
- for each DIL interval, selecting a model that matches the selected DIL signals in the DIL interval to thereby identify RBS and PAD impairments for each DIL interval.

16. A method of identifying Robbed Bit Signaling (RBS) and PAD digital impairments in a plurality of sets of Digital Impairment Leaning (DIL) signals that are repeatedly transmitted from a server modem to a client modem during a corresponding plurality of DIL intervals, the method comprising the steps of:
- responsive to a plurality of model DIL signals that correspond to a plurality of PAD levels that are not subject to RBS;
- identifying a PAD level for the plurality of sets of DIL signals in the plurality of DIL intervals; and
- responsive to a plurality of model DIL signals that correspond to a plurality of RBS types that are subject to the PAD level so identified; and
- identifying an RBS type for individual sets of DIL signals, based upon the PAD level so identified.

17. A modem comprising:
- means for receiving a plurality of sets of Digital Impairment Learning (DIL) signals from a server modem during a corresponding plurality of DIL intervals;
- means for identifying one of the DIL intervals that contains DIL signals that are not subject to Robbed Bit Signaling (RBS) digital impairments;
- means for determining a Packet Assenbler/Disassembler (PAD) level digital impairment for the DIL signals in the one of the DIL intervals so identified; and
- means for applying the PAD level so determined to the DIL signals in remaining ones of the DIL intervals, to identify an RBS type for the DIL signals in the remaining ones of the DIL intervals.

18. A modem according to claim 17 wherein the means for identifying comprises:
- means for obtaining a plurality of sets of model DIL signals that correspond to a plurality of PAD levels that are not subject to RBS;
- means for comparing the sets of DIL signals in the plurality of DIL intervals to the plurality of sets of model DIL signals; and
- means for selecting one of the DIL intervals in the plurality of DIL intervals, in response to the means for comparing, to thereby identify one of the DIL intervals that contains DIL signals that are not subject to RBS.

19. A modem according to claim 17 wherein the means for comparing comprises means for computing a sum of squares of differences between the sets of DIL signals in the plurality of DIL intervals and the plurality of sets of model DIL signals.

20. A modem according to claim 17 wherein the means for selecting comprises means for selecting one of the DIL intervals in the plurality of DIL intervals that contains the DIL signals that most closely match one of the sets of model DIL signals.

21. A modem according to claim 17 wherein the means for determining a PAD level comprises:
- means for obtaining a plurality of sets of model DIL signals that correspond to a plurality of PAD levels that are not subject to RBS;
- means for comparing the DIL signals in the one of the DIL intervals so identified to the plurality of sets of model DIL signals; and
- means for selecting one of the plurality of sets of model DIL signals in response to the means for comparing, to thereby determine a PAD level for the DIL signals in the one of the DIL intervals so identified.

22. A modem according to claim 21 wherein the means for comparing comprises means for computing a sum of squares of differences between the model DIL signals.

23. A modem according to claim 21 wherein the means for selecting comprises means for selecting one of the plurality of sets of model DIL signals that most closely matches the DIL signals in the one of the DIL intervals so identified.

24. A modem according to claim 21 wherein the plurality of sets of model DIL signals are scaled to account for equalizer training in the presence of the corresponding PAD level.

25. A modem according to claim 17 wherein the means for applying comprises:
- means for obtaining a plurality of sets of model DIL signals that correspond to a plurality of RBS types for the PAD so determined;
- means for comparing the DIL signals in the remaining ones of the DIL intervals to the plurality of sets of model DIL signals; and
- means for selecting one of the plurality of sets of model DIL signals for each of the remaining ones of the DIL intervals, in response to the means for comparing, to thereby identify an RBS type for the DIL signals in the remaining ones of the DIL intervals.

26. A modem according to claim 25 wherein the means for comparing comprises means for computing a sum of squares of differences between the DIL signals in the remaining ones of the DIL intervals and the plurality of sets of model DIL signals.

27. A modern according to claim 25 wherein the means for selecting comprises means for selecting one of the plurality of sets of model DIL signals that most closely matches the DIL signals in the remaining one of the DIL intervals.

28. A modem according to claim 25 wherein the plurality of sets of model DIL are scaled to account for equalizer training in the presence of the PAD so determined.

29. A modem according to claim 17 further comprising:
- means for comparing the DIL signals in the one of the DIL intervals to the DIL signals in the one of the remaining ones of the DIL intervals in response to the means for applying identifying one of the remaining ones of the DIL intervals as not subject to RBS.

30. A modem according to claim 17 wherein the means for identifying, determining and applying are responsive to only selected ones of the DIL signals in the DIL intervals.

31. A modem comprising:
 means for receiving a plurality of sets of Digital Impairment Learning (DIL) signals from a server modem during a corresponding plurality of DIL intervals;
 means for generating the models of DIL signals having combinations of RBS types and PAD levels; and
 means for computing sums of squares of differences between selected ones of the DIL signals in the plurality of sets and said generated model DIL signals; and
 means for selecting a model that matches the selected DIL signals for each DIL interval to thereby identify RBS and PAD impairments for each DIL interval.

32. A modem comprising:
 means for receiving a plurality of sets of Digital Impairment Learning (DIL) signals from a server modem during a corresponding plurality of DIL intervals;
 means responsive to a plurality of model DIL signals that correspond to a plurality of PAD levels that are not subject to RBS, said means for identifying a PAD level for selected ones of the plurality of sets of DIL signals in the plurality of DIL intervals; and
 means responsive to a plurality of model DIL signals that corresponds to a plurality of RBS types that are not subject to the identified PAD level, said means for identifying an RBS type for the selected sets of DIL signals, based upon the identified PAD level.

33. A computer program product for identifying Robbed Bit Signaling (RBS) and PAD digital impairments in a plurality of sets of Digital Impairment Learning (DIL) signals that are repeatedly transmitted from a server modem to a client modem during a corresponding plurality of DIL intervals, the computer program product comprising a computer-readable storage medium having computer-readable program code embodied in the medium, the computer-readable program code comprising:
 computer-readable program code for identifying one of the DIL intervals that contains DIL signals that are not subject to RBS;
 computer-readable program code for determining a PAD level for the DIL signals in the one of the DIL intervals so identified; and
 computer-readable program code for applying the PAD level so determined to the DIL signals in remaining ones of the DIL intervals, to identify an RBS type for the DIL signals in the remaining ones of the DIL intervals.

34. A computer program product according to claim 33 wherein the computer-readable program code for identifying comprises the steps of:
 computer-readable program code for obtaining a plurality of sets of model DIL signals that correspond to a plurality of PAD levels that are not subject to RBS;
 computer-readable program code for comparing the sets of DIL signals in the plurality of DIL intervals to the plurality of sets of model DIL signals; and
 computer-readable program code for selecting one of the DIL intervals in the plurality of DIL intervals, based on results of the computer-readable program code for comparing, to thereby identify one of the DIL intervals that contains DIL signals that are not subject to RBS.

35. A computer program product according to claim 34 wherein the computer-readable program code for comparing comprises computer-readable program code for computing a sum of squares of differences between the sets of DIL signals in the plurality of DIL intervals and the plurality of sets of model DIL signals.

36. A computer program product according to claim 34 wherein the computer-readable program code for selecting comprises computer-readable program code for selecting one of the DIL intervals in the plurality of DIL intervals that contains the DIL signals that most closely match one of the sets of model DIL signals.

37. A computer program product according to claim 33 wherein the computer-readable program code for determining a PAD level comprises:
 computer-readable program code for obtaining a plurality of sets of model DIL signals that correspond to a plurality of PAD levels that arc not subject to RBS;
 computer-readable program code for comparing the DIL signals in the one of the DIL intervals so identified to the plurality of sets of model DIL signals; and
 computer-readable program code for selecting one of the plurality of sets of model DIL signals based on results of the computer-readable program code for comparing, to thereby determine a PAD level for the DIL signals in the one of the DIL intervals so identified.

38. A computer program product according to claim 37 wherein the computer-readable program code for comparing comprises computer-readable programcode for computing a sum of squares of differences between the model DIL signals.

39. A computer program product according to claim 37 wherein the computer-readable program code for selecting comprises computer-readable program code for selecting one of the plurality of sets of model DIL signals that most closely matches the DIL signals in the one of the DIL intervals so identified.

40. A computer program product according to claim 37 wherein the plurality of sets of model DIL signals are scaled to account for equalizer training in the presence of the corresponding PAD level.

41. A computer program product according to claim 33 wherein the computer-readable program code for applying comprises;
 computer-readable program code for obtaining a plurality of sets of model DIL signals that correspond to a plurality of RBS types for the PAD so determined;
 computer-readable program code for comparing the DIL signals in the remaining ones of the DIL intervals to the plurality of sets of model DIL signals; and
 computer-readable program code for selecting one of the plurality of sets of model DIL signals for each of the remaining ones of the DIL intervals, based on results of the computer-readable program code for comparing, to thereby identify an RBS type for the DIL signals in the remaining ones of the DIL intervals.

42. A computer program product according to claim 41 wherein the computer-readable program code for comparing comprises computer-readable program code for computing a sum of squares of differences between the DIL signals in the remaining ones of the DIL intervals and the plurality of sets of model DIL signals.

43. A computer program product according to claim 41 wherein the computer-readable program code for selecting comprises computer-readable program code for selecting one of the plurality of sets of model DIL signals that most closely matches the DIL signals in the remaining one of the DIL intervals.

44. A computer program product according to claim 41 wherein the plurality of sets of mode DIL are scaled to account for equalizer training in the presence of the PAD so determined.

45. A computer program product according to claim 33 further comprising;
- computer-readable program code for comparing the DIL signals in the one of the DIL intervals to the DIL signals in the one of the remaining ones of the DIL intervals in response to the computer-readable program code for identifying one of the remaining ones of the DIL intervals as not subject to RBS.

46. A computer program product according to claim 33 wherein the computer-readable program code for identifying, determining and applying only are responsive to selected ones of the DIL signals in the DIL intervals.

47. A computer program product for identifying Robbed Bit Signaling (RBS) and PAD digital impairments in a plurality of sets of Digital Impairment Learning (DIL) signals that are repeatedly transmitted from a server modem to a client modem during a corresponding plurality of DIL intervals, the computer program product comprising a computer-readable storage medium having computer-readable program code embodied in the medium, the computer-readable program code comprising:
- computer-readable program code for generating models of DIL signals having combinations of RBS types and PAD levels; and
- computer-readable program code for computing sums of squares of differences between selected ones of the DIL signals in the plurality of sets and the generated mode DIL signals having; and
- computer-readable program code for selecting a model that matches the selected DIL signals for each DIL interval to thereby identify RBS and PAD impairments for each DIL interval.

* * * * *